United States Patent
Singh et al.

(10) Patent No.: US 7,702,597 B2
(45) Date of Patent: Apr. 20, 2010

(54) CROP YIELD PREDICTION USING PIECEWISE LINEAR REGRESSION WITH A BREAK POINT AND WEATHER AND AGRICULTURAL PARAMETERS

(75) Inventors: Ramesh P. Singh, Fairfax, VA (US); Anup Krishna Prasad, Kanpur (IN); Vinod Tare, Kanpur (IN); Menas Kafatos, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1343 days.

(21) Appl. No.: 11/108,674

(22) Filed: Apr. 19, 2005

(65) Prior Publication Data
US 2005/0234691 A1 Oct. 20, 2005

Related U.S. Application Data

(60) Provisional application No. 60/563,588, filed on Apr. 20, 2004.

(51) Int. Cl.
*G06F 15/18* (2006.01)
*G06E 1/00* (2006.01)
*G06G 7/00* (2006.01)

(52) U.S. Cl. .......................................................... 706/21
(58) Field of Classification Search ..................... 706/21
See application file for complete search history.

(56) References Cited

OTHER PUBLICATIONS over Singh et al. "Vegetation and temperature condition indices from NOAA AVHRR data for drought monitoring over India", Int. J. Remote Sensing, Nov. 20, 2003, vol. 24, No. 22, pp. 4939-4402.*
Wang et al. "Vegetation Temperature Condition Index and Its Application for Drought Monitoring", IEEE, 2001, pp. 141-143.*
Haberhauer et al. "Drift and transmission FT-IR spectroscopy of forest soils: an approach to determine decomposition processes of forest litter", Vibrational Spectroscopy 19, 1999, pp. 413-417.*

* cited by examiner

*Primary Examiner*—David R Vincent
*Assistant Examiner*—Li-Wu Chang
(74) *Attorney, Agent, or Firm*—David Yee; David G. Grossman

(57) ABSTRACT

Crop yield may be assessed and predicted using a piecewise linear regression method with break point and various weather and agricultural parameters, such as NDVI, surface parameters (soil moisture and surface temperature) and rainfall data. These parameters may help aid in estimating and predicting crop conditions. The overall crop production environment can include inherent sources of heterogeneity and their nonlinear behavior. A non-linear multivariate optimization method may be used to derive an empirical crop yield prediction equation. Quasi-Newton method may be used in optimization for minimizing inconsistencies and errors in yield prediction. Minimization of least square loss function through iterative convergence of pre-defined empirical equation can be based on piecewise linear regression method with break point. This non-linear method can achieve acceptable lower residual values with predicted values very close to the observed values. The present invention can be modified and tailored for different crops worldwide.

12 Claims, 20 Drawing Sheets

| | Corn Crop Yield | | | Soybean Crop Yield | | |
|---|---|---|---|---|---|---|
| Year | Observed | Predicted | Residual | Observed | Predicted | Residual |
| 1982 | 120 | 106.5419 | 13.4581 | 36.5 | 32.88022 | 3.61978 |
| 1983 | 87 | 83.7547 | 3.2453 | 35 | 32.28571 | 2.7143 |
| 1984 | 112 | 102.6428 | 9.3572 | 31.5 | 35.39592 | -3.89591 |
| 1985 | 126 | 139.1426 | -13.1426 | 38 | 38.1298 | -0.1298 |
| 1986 | 135 | 130.8788 | 4.1212 | 41.5 | 43.02155 | -1.52154 |
| 1987 | 130 | 132.7112 | -2.7111 | 43.5 | 43.85471 | -0.35471 |
| 1988 | 84 | 98.5832 | -14.5832 | 31 | 33.76202 | -2.76202 |
| 1989 | 118 | 123.834 | -5.834 | 39 | 38.0378 | 0.9622 |
| 1990 | 126 | 136.5239 | -10.5239 | 41.5 | 42.30204 | -0.80204 |
| 1991 | 117 | 110.6744 | 6.3256 | 40.5 | 38.62787 | 1.87213 |
| 1992 | 147 | 141.4558 | 5.5442 | 44 | 44.34576 | -0.34576 |
| 1993 | 80 | 105.4158 | -25.4158 | 31 | 33.38066 | -2.38066 |
| 1994 | 152 | 147.0145 | 4.9855 | 50.5 | 48.65998 | 1.84002 |
| 1995 | 123 | 109.5531 | 13.4469 | 44 | 43.78539 | 0.21461 |
| 1996 | 138 | 139.0412 | -1.0412 | 44 | 43.45447 | 0.54553 |
| 1997 | 138 | 137.6851 | 0.3149 | 46 | 47.34258 | -1.34258 |
| 1998 | 145 | 140.6691 | 4.3308 | 48 | 45.52408 | 2.47592 |
| 1999 | 149 | 151.7808 | -2.7808 | 44.5 | 46.51844 | -2.01844 |
| 2000 | 144 | 143.467 | 0.533 | 43.5 | 44.39583 | -0.89583 |
| 2001 | 146 | 135.6299 | 10.3701 | 44 | 41.79518 | 2.20482 |

FIG. 7

| Variable | Coefficients | Corn | Soybean |
|---|---|---|---|
| Constant | $c_1$ | -12734 | 221.63 |
| NDVI | $a_1$ | 156.42 | 128.79 |
| SM | $a_2$ | -0.179 | -0.022 |
| ST | $a_3$ | 51.13 | -1.003 |
| RAINFALL | $a_4$ | -31.7 | 0.4886 |
| Constant | $c_2$ | -4299 | -362.6 |
| NDVI | $b_1$ | 172.97 | 71.025 |
| SM | $b_2$ | 0.0418 | -0.008 |
| ST | $b_3$ | 16.855 | 1.369 |
| RAINFALL | $b_4$ | -9.249 | -0.578 |
| Break Point | $m$ | 125.85 | 40.875 |
| | | | |
| R | | 0.88742 | 0.9309 |
| Variance accounted % | | 78.75% | 86.66% |
| R-square | | 0.78 | 0.86 |

FIG. 8

| Variable for Wheat | Coefficients | Andhra Pradesh (AP) | Bihar | Gujarat | Haryana | Himachal Pradesh (HP) | Maharashtra | Madhya Pradesh (MP) | Orissa | Punjab | Uttar Pradesh (UP) | West Bengal (WB) |
|---|---|---|---|---|---|---|---|---|---|---|---|---|
| Constant | $c_1$ | 9120.836 | 33177.51 | 83997.41 | -18427.5 | 30853.1 | 4630.24 | 25467.37 | 3805.971 | -8405.63 | 26600.24 | 167.3733 |
| NDVI | $a_1$ | -636.634 | -1582.9 | -1510.99 | 7037.932 | -2421.7 | 1262.469 | -562.025 | 155.8108 | 7940.832 | 1521.971 | 2397.782 |
| SM | $a_2$ | -389.903 | 4689.055 | -9735.31 | 6007.684 | 2873.634 | -3910.31 | -883.156 | -791.427 | 46052.44 | 847.4405 | -10662 |
| ST | $a_3$ | -27.2939 | -107.253 | -272.734 | 60.7532 | -100.489 | -150.17 | -80.3211 | -8.5711 | 6.8002 | -88.3558 | 8.2665 |
| RAINFALL | $a_4$ | -2.25336 | -5.4135 | 65.5548 | 52.1468 | 35.308 | 26.3148 | -3.9253 | 7.8212 | -40.934 | -0.639003 | 14.9442 |
| Constant | $c_2$ | -19896.4 | 5743.286 | 5884.689 | -25615.2 | -3587.27 | 28581.84 | 8249.864 | 79250.87 | 2915.116 | 15848.92 | -9597.86 |
| NDVI | $b_1$ | 595.2907 | -131.351 | 2405.45 | 2948.407 | 706.8863 | 3112.894 | 1832.129 | 1786.026 | 1269.703 | 214.2972 | -3342.53 |
| SM | $b_2$ | -136.838 | -4021.91 | 5450.647 | -7319.03 | 1120.164 | 1598.811 | -2275.83 | 1145.116 | -3396.6 | -5677.15 | -3949.89 |
| ST | $b_3$ | 68.28058 | -10.7428 | -16.4422 | 98.6668 | 16.3827 | -94.1602 | -22.9844 | -265.895 | 17.5874 | -42.8236 | 45.0862 |
| RAINFALL | $b_4$ | -1.12887 | 10.8445 | 3.8808 | 6.9576 | -9.9078 | 20.4589 | 8.0326 | -4.3738 | 14.6278 | -0.111986 | 3.3679 |
| Break Point | $m$ | 657 | 1833.375 | 2122.5 | 3347.75 | 1348.563 | 1086.625 | 1446.813 | 1537.125 | 3706.063 | 2253.063 | 2147.438 |
| | R | 0.97631 | 0.9726 | 0.9704 | 0.9752 | 0.9614 | 0.9606 | 0.9649 | 0.9774 | 0.9132 | 0.91621 | 0.9498 |
| | Variance accounted % | 95.32% | 94.59% | 94.16% | 95.10% | 92.42% | 92.27% | 93.11% | 95.52% | 83.39% | 83.94% | 90.21% |
| | R-square | 0.95 | 0.94 | 0.94 | 0.95 | 0.92 | 0.92 | 0.93 | 0.95 | 0.83 | 0.83 | 0.90 |

FIG. 19

| Variable for Rice | Coefficients | Andhra Pradesh (AP) | Bihar | Gujarat | Haryana | Himachal Pradesh (HP) | Maharashtra | Madhya Pradesh (MP) | Punjab | Orissa | Uttar Pradesh (UP) | West Bengal (WB) | Tamil Nadu (TN) |
|---|---|---|---|---|---|---|---|---|---|---|---|---|---|
| Constant | $c_1$ | -14812.5 | -36302.6 | -240.872 | 43362.32 | 52043.91 | 5306.404 | -94272 | 38720.47 | 19913.81 | -116775 | -270338 | -108292 |
| NDVI | $a_1$ | 6569.089 | -2792.18 | 1462.615 | 1860.114 | -102.813 | -3266.42 | 1585.862 | 1917.067 | 13.7765 | 4784.965 | 6869.243 | 2362.422 |
| SM | $a_2$ | 25374.06 | 12224.77 | -3645.68 | -11695.4 | -6668.68 | 15517.82 | 7649.704 | -5826.53 | 3061.827 | -11112.8 | 7404.529 | 6510.48 |
| ST | $a_3$ | 465.939 | 113.0384 | 5.6515 | -127.844 | -163.658 | -28.3098 | 307.277 | -114.612 | -68.9733 | 409.4616 | 892.9109 | 364.8555 |
| RAINFALL | $a_4$ | 0.485432 | -0.93317 | 1.6723 | -1.0755 | 0.8667 | -0.9588 | 2.3757 | -5.1202 | -0.1839 | 1.112905 | -0.0569 | -7.1318 |
| Constant | $c_2$ | 7123.501 | -9665.91 | -3826.22 | -19124.5 | -35906.2 | 70643.99 | 49485.11 | -11125.1 | -53972.6 | -14838.2 | -66061.2 | -7933.34 |
| NDVI | $b_1$ | 675.0699 | 444.0695 | 1009.815 | 2192.897 | 428.0616 | 1173.625 | 227.4207 | 963.3945 | -512.009 | 2098.917 | 422.0377 | 1956.752 |
| SM | $b_2$ | 7338.523 | 4877.996 | 3377.256 | 825.3894 | 5897.619 | -522.353 | 5334.601 | 3589.493 | 6078.601 | 727.4766 | -6790.95 | -3094.48 |
| ST | $b_3$ | -239.457 | 30.994 | 13.6534 | 708.8494 | 118.1317 | -233.051 | -170.254 | 44.4212 | 177.9545 | 53.42631 | 235.5125 | 38.0575 |
| RAINFALL | $b_4$ | -0.009026 | -0.2361 | 0.0217 | -1.5901 | -0.3384 | 1.3799 | -0.514 | -0.9952 | 1.1551 | 0.010234 | 1.0102 | -0.2564 |
| Break Point | $m$ | 2405.312 | 1265.733 | 1347.533 | 2597.125 | 1250.937 | 1514.313 | 778.8125 | 3269.312 | 1226.187 | 1761.875 | 1958.5 | 2956.5 |
| | | | | | | | | | | | | | |
| R | | 0.96056 | 0.9189 | 0.991 | 0.9824 | 0.9035 | 0.9658 | 0.9769 | 0.908 | 0.8893 | 0.97398 | 0.9808 | 0.9076 |
| Variance accounted % | | 92.27% | 84.44% | 98.20% | 93.29% | 81.63% | 93.29% | 95.44% | 82.44% | 79.08% | 94.87% | 96.19% | 82.36% |
| R-square | | 0.92 | 0.84 | 0.98 | 0.96 | 0.81 | 0.93 | 0.95 | 0.82 | 0.79 | 0.94 | 0.96 | 0.82 |

FIG. 20

CROP YIELD PREDICTION USING PIECEWISE LINEAR REGRESSION WITH A BREAK POINT AND WEATHER AND AGRICULTURAL PARAMETERS

CROSS-REFERENCE TO RELATED APPLICATIONS

The present application claims the benefit of provisional patent application: Ser. No. 60/563,588 to Singh et al., filed on Apr. 20, 2004, entitled "Crop Yield Prediction," which is hereby incorporated by reference.

BACKGROUND OF THE INVENTION

Monitoring crop conditions is important for the economic development of any nation, particularly developing ones. The use of remote sensing has proved to be very important in monitoring the growth of agricultural crops and irrigation scheduling. Efforts have been made to develop various indices for different crops for different regions worldwide. Generally, crop production has a direct impact on year-to-year variations on national and international economies and food supply.

Weather and climatic conditions are important parameters in controlling the yield of agricultural crops. Crop-weather relations have been used for predicting crop yield. Least-square regression is a principle method usually applied into crop-weather relationships, which may be complex and non-linear. However, conventional approaches of forecasting crop yield using ground based data collection is tedious, time consuming and often difficult.

Using remote sensing data, efforts have been made to develop various indices such as vegetation condition index (VCI), thermal condition index (TCI) and normalized difference vegetation index (NDVI). VCI and TCI are well known for drought detection, monitoring excessive soil wetness, assessment of weather impacts on vegetation and evaluation of vegetation health and productivity. NDVI reflects vegetation greenness; it indicates levels of healthiness in the vegetation development. Though vegetation development of crop fields may differ from those of natural vegetation because of human influences involved such as irrigation, fertilization and pesticidal activity, NDVI can be a valuable source of information for the crop conditions. NDVI data may be used extensively in vegetation monitoring, crop yield assessment and forecasting.

In recent years, remote sensing data is being extensively used for monitoring the state of the agricultural fields, vegetation cover and also to estimate crop yield in different regions around the globe. Yet, most existing crop yield models require various types of field data, which are not always or accurately available. Overall, field data can affect the quality of yield estimates. Different methods have been developed to estimate crop yields by means of satellite data. These include a neural network, autoregressive (AR) state-space models, least-square regression, exponential-linear (EL) crop growth algorithm and numerical crop yield model. Each has been used to predict crop yield with moderate success. Among numerous crop studies, many utilized vegetation indices derived from remotely sensed visible and near-infrared reflection data sets provided by Landsat Thematic Mapper (TM), Systeme Probatoire d'Observation de la Terra (SPOT) or National Oceanic and Atmospheric Administration's (NOAA) Advanced Very High Resolution Radiometer (AVHRR). Earlier studies, in general, utilized NDVI value alone, but included transformations such as simple integrations of NDVI to more complicated creations of a new vegetation index based on NDVI. For example, NDVI integration during the wheat grain filling period was used on a simple linear regression model to derive wheat yield prediction for Emilia Romagna, Italy from 1986 to 1989, which resulted 2.3% to 18.9% of relative difference with the official yield estimates. A similar approach of a simple model using a cumulative NDVI was studied for cotton, maize, rice and wheat in northwest Thessaloniki, northern Greece from 1987 to 1989, showing 0% to 43% of difference in the yield prediction from the official data. In addition, a standardized NDVI created by multiannual NDVI statistics was used in a linear regression model for millet and sorghum yield prediction for Niger in Sahelian region from 1986 to 1989, of which the prediction showed R=0.85 with the estimate of Food and Agricultural Organization (FAO). Furthermore, VCI was used in a quadratic model to predict maize crop yield for 42 Crop Reporting Districts (CRDs) of the United States Corn Belt from 1985 to 1992, which showed 0.1% to 10.4% of departure from the United States Department of Agriculture (USDA) final estimates.

In addition to using NDVI in crop yield models, efforts have also been made to use other variables such as Leaf Area Index (LAI), albedo and meteorological data (precipitation and temperature as well as land use classifications). For example, more than 40 of biogeochemical and meteorological parameters were used in a general large area model (GLAM) to predict groundnut yields of India, which has shown the correlation coefficient 0.76 between observed and simulated yields. Moreover, NDVI field classification was found to be a major advantage for CROPGRO-Soybean model, and CERES-Maize model was used to find the model explained 76% of the yield variability of a relatively small area (20-ha field) in central Iowa for 3 years (Batchelor, 2002). Multivariables, such as reflectance data from satellite observation, land use maps, sowing dates and leaf area index of a specific crop (e.g., winter wheat), have also been used for a crop growth model. Because the inter-annual variability of crop production rate has been a general concern of the crop yield prediction models, in a spatial variability, NDVI has been strongly suggested to be a major parameter of the models, showing higher correlation with the yields than potential extractable soil water for a soybean model.

Currently, the most common approach is to develop empirical relationships between NDVI and crop yield. However, the general drawback of most methods using statistical relationships between NDVI and crop yield is that they have a strong empirical character and that the correlation coefficients are moderate to low. To overcome this problem, a reasonable approach is needed to incorporate heterogeneity in inputs over the production environment to minimize sources of variability and errors in yield prediction. In spite of the availability of numerous crop-growth models, one main difficulty still arises due to crop model input requirements: climate can be a major factor affecting crop yield. Therefore, what is needed is a method that better predicts crop yield by incorporating multiple vegetation and environmental factors, such as NDVI, soil moisture (SM), surface temperature (ST) and rainfall (Rainfall).

BRIEF SUMMARY OF THE INVENTION

The present invention teaches a method to predict crop yield. It also teaches a program storage device readable by a machine that may store a machine readable language to predict crop yield. Furthermore, it is also a crop yield predicting device.

In one aspect of the invention, crop yield may be predicted by receiving data, such as vegetation factors, identifying an initial piecewise linear empirical equation with at least one break point that may be applicable to data received, and determining coefficients of such equation by performing an optimization process.

Any crop from any geographical location may be examined. Data received with respect to a particular crop may be based upon a select increment of time according to a range of time. When predicting its yield, it is preferable to use data averages from the selected increment of time.

The optimization process may perform multiple iterative convergences on the identified initial piecewise linear empirical equation with at least one break point to optimize coefficients. Additionally, this process may use a non-linear Quasi-Newton method. This method may apply a loss function.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

FIG. 7 shows observed and predicted crop yield of corn and soybean for Iowa using non-linear piecewise linear regression with breakpoint (Quasi-Newton) method.

FIG. 8 shows coefficients and breakpoint for corn and soybean crop yield for Iowa.

FIG. 19 shows coefficients and breakpoint for wheat crop yield for major wheat producing states in India.

FIG. 20 shows coefficients and breakpoint for rice crop yield for major rice producing states in India.

DETAILED DESCRIPTION OF THE INVENTION

The present invention is a method, program storage device readable by a machine and crop yield predicting device for predicting crop yield. Historical satellite and meteorological data may be used to derive empirical equations to forecast crop yield. Specifically, NDVI, SM, ST and Rainfall data may be fitted to predefined empirical equations using piecewise linear regression and optimization of least square loss function through a non-linear Quasi-Newton method. A non-linear and iterative method can help minimize loss function to yield values for coefficients of the empirical equations.

The derived empirical equations can be used to forecast crop yield of any crop of choice based on data obtained before harvest. The piecewise linear regression and Quasi-Newton method can also be applied to other states, provinces, territories, commonwealths, countries, etc., where crop production may be dependent on weather and climatic conditions.

Figure 1:
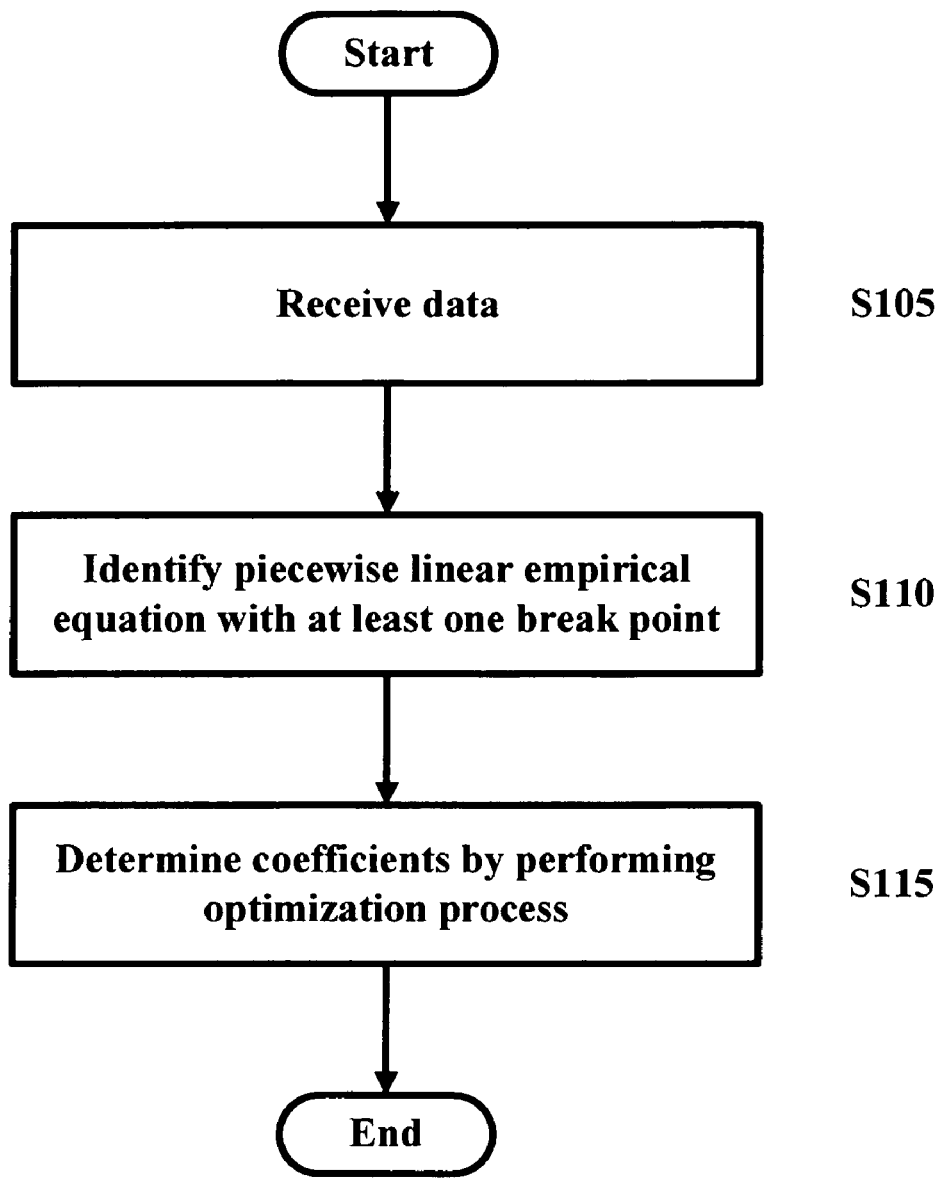
FIG. 1 shows one embodiment of a method for predicting crop yield as per one aspect of the present invention.
Figure 2:
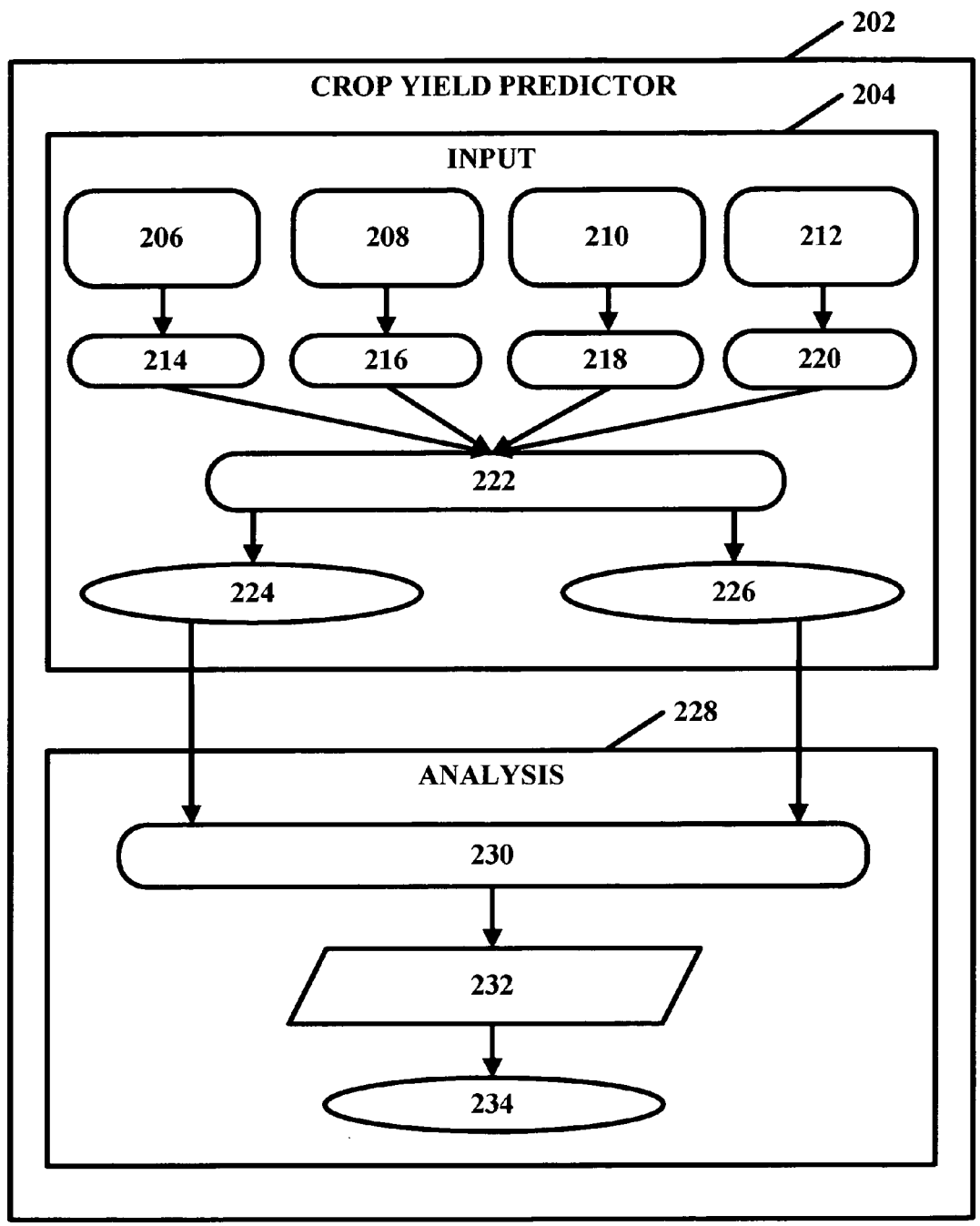
FIG. 2 shows one embodiment of a program storage device readable by a machine or crop yield predicting device as per one aspect of the present invention.

Referring to FIGS. 1 and 2, the present invention describes how crop yield prediction may be achieved. FIG. 1 represents one embodiment of a method as per an aspect of the present invention; FIG. 2 represents one embodiment of a program storage device readable by a machine 202 or crop yield predicting device 202 as per an aspect of the present invention. Examples of a program storage device capable of storing a machine readable language to predict crop yield include, but are not limited to, a computer, compact disc (CD), flash memory disk, digital video disc (DVD), random access memory (RAM), read only memory (ROM), etc. Examples of a crop yield predicting device include, but not limited to, a personal digital assistant (PDAs) or its equivalent, mobile analyzer, centralized and/or localized analyzer, etc. A data collector 204 may receive data S105. Such data can be various vegetation factors, including, but limited to, a 10-day composite NDVI data 206; monthly SM data 208; monthly ST data 210; and daily Rainfall data (rain gauge data) 212. NDVI data 206 may be obtained from the NOAA AVHRR. SM data 208, ST data 210 and Rainfall data 212 may be obtained from NOAA's National Centers for Environmental Protection (NCEP). Based on the data received, users may concentrate on particular data according to a time-increment, e.g., daily, weekly, monthly, etc., within a selected range of time. For example, monthly NDVI data for years 1984-1999 214 may be selected from the 10-day composite NDVI data 206. Similarly, monthly SM data for years 1984-1999 216 may be selected from monthly SM data 208. Monthly ST data for years 1984-1999 218 may be selected from monthly ST data 210. Monthly Rainfall data for years 1984-1999 220 may be selected from daily rainfall data 212. It should be noted that for whatever time range is chosen for one vegetation factor, the time range should be the same for the other vegetation factors to maintain consistency. From the selected time range, the averages for each vegetation factor during crop growth and ripening seasons (such as days, weeks, months, etc.) 222 may be selected and used for analyzing a set of independent variables 224 and a dependent variable 226.

In general, to analyze the selected data, the present invention teaches a multitude, but not limited to, of steps including: (1) identifying an initial model, (2) converging iteratively using a "stepping criteria" and (3) terminating a search when either the stepping criteria or the number of iterations allowed reaches its limit. A data analyzer 228 may be used to conduct the analysis. The data analyzer 228 may use a non-linear estimation approach to compute the relationship between the set of independent variables 224 and a dependent variable 226. The non-linear estimation approach can be a non-linear piecewise linear regression with break point (Quasi-Newton method). Independent variables may include, but are not limited to, NDVI, SM, ST and Rainfall. The dependent variable may be crop yield and can vary as a function diverse from independent variables. Using data from both variables, an initial piecewise linear empirical equation with at least one break point may be identified S110.

It is well known in the art that a Quasi-Newton method has been used for multivariate optimization. This non-linear method may be used to minimize the least square function through iterative convergence of a pre-defined empirical equation. In the Quasi-Newton method, the first-order derivative of a function at a point may be computed to find the slope of the function at that point. The second-order derivative may be computed to indicate how fast the slope is changing at the respective point and its direction. The Quasi-Newton method may evaluate the function at different points at each step to estimate the first-order and second-order derivatives, both of which can be used to determine the minimum loss function. The iterative method should work for multi-independent variables and the dependent variable crop yield, in both above and below the break point. A non-linear optimization approach may achieve acceptable lower residual values with predicted values close to observed values.

When NDVI, SM, ST or Rainfall data is varied, such data usually does not follow any distinct linear dependency among themselves and with respect to crop yield. It may be problematic to model a dynamic relationship using conventional methods like multivariable multiple regression. Hence, rather than using a conventional method, the present invention's empirical equation may be based on a piecewise linear regression method with break point 230.

Usually dependent on the pool of available data, coefficients of the empirical equation may be determined by applying an optimization process on the piecewise linear empirical equation and selected data S115. The optimization process may perform multiple iterative convergences on the empirical equation and selected data to optimize coefficients. Additionally, this process may also use a non-linear Quasi-Newton method.

Again, as one preferred embodiment, crop yield data should span a range of time for a user-selected or particular crop in a user-selected or particular area of interest. For example, time can be measured in days, months, years, etc. Crops can be any vegetable, fruit, grain, nut, legume, etc. Area of interest can be a public or private garden, village, town, city, state, nation, etc. The break point (m) may be chosen using the average from the range of time for a particular crop in a particular area of interest. Coefficients of multiple variables as indicated in Table I may include, but are not limited to, the following:

TABLE 1

Variables and Coefficients

| Variable | Coefficients |
|---|---|
| Constant | $c_1$ |
| NDVI | $a_1$ |
| SM | $a_2$ |
| ST | $a_3$ |
| Rainfall | $a_4$ |
| Constant | $c_2$ |
| NDVI | $b_1$ |
| SM | $b_2$ |
| ST | $b_3$ |
| Rainfall | $b_4$ |
| Break Point | m |

Using these preferred coefficients, a piecewise linear empirical equation 230 such as the following may be obtained:

a) {For crop yield<break point m}

$$\text{Crop Yield}_{crop} = [c_1 + (a_1 \times NDVI) + (a_2 \times SM) + (a_3 \times ST) + (a_4 \times RAINFALL)] \quad (1)$$

or b) {For crop yield>break point m}

$$\text{Crop Yield}_{crop} = [c_2 + (b_2 \times NDVI) + (b_2 \times SM) + (b_3 \times ST) + (a_4 \times RAINFALL)] \quad (2)$$

where each variable may be represented in the following Table 2 as:

TABLE 2

Representation of Variables in Empirical Equations

| Variable | Representation |
|---|---|
| NDVI | Normalized Difference Vegetation Index |
| SM | Soil Moisture (mm) |
| ST | Surface Temperature (K) |
| Rainfall | Total rainfall (in 0.01 mm/month) |
| $c_1, c_2, a_i, b_i$ for i = 1 to 4 | Coefficients |
| m | Mean crop yield for a range of time for a particular crop in a particular area of interest (Break point) |

Loss function ($L_f$) 230 may also be used. It can be the least square, such as $$L_f = (\text{Observed} - \text{Predicted})^2 \quad (3)$$

The Quasi-Newton method may use loss function to generate results as close as possible to observed data. At each iteration, loss function may be computed to minimize the square of the difference between observed and predicted crop yield via a pre-defined empirical equation. The computation may be viewed as optimization process (alternatively called an Iterative and Non-linear Quasi-Newton Multivariate Optimization Process) 232, which can run as long as initial values, stepping values, number of iterations and convergence criteria are favorable. For example, the optimization process 232, which may be applied for all variables, may have an initial value of 0.1, an initial stepping value of 0.5, a break point of the mean of a 16-year crop yield, a condition of convergence of 0.0001, and a number of iterations of <100. The computation may terminate if conditions like stepping criteria or number of iterations allowed reach its limit. Therefore, loss function can approach theoretically up to 100% for the R-square value. However, it may depend on the weight of consideration given to independent variables. It may also depend on the absence of any other major governing factor affecting crop yield. For example, small data sets, such as 7-10 years, may produce better results than large data sets, such as 20 years. This observation is likely based on less variation in patterns concerning NDVI, SM, ST, Rainfall and respective time frame regarding crop yield.

Yet still, NDVI, SM, ST and Rainfall data may be major indicators or variables controlling normal crop growth. Information about NDVI, SM, ST and Rainfall data for each area of interest before a harvesting period may be useful to predict crop yield for that season. Results may indicate a shortfall, par production or surplus in crop yield.

When the optimization process 232 terminates, output 234 may be given. Output 234 may include constants and coefficient values for the empirical equations, predicted crop yield (measurable, e.g., in Kg/ha), residual values, R and R-square values, and percentage of variance accounted.

Case Study Examples

1. Iowa—Corn and Soybean

The State of Iowa belongs to the United States Corn Belt (Corn Belt). The sizes of Iowa's counties are relatively smaller than those of other states belonging to the Corn Belt. According to a 1997 Census of Agriculture study, these counties recorded the highest harvested cropland in 1997. These facts basically aid in predicting crop yield because the NDVI values belonging to the pixels of a county tend to closely correspond to the true farming area compared to other states having larger counties. This example illustrates how the present invention may predict corn yield and soybean yield by focusing on 10 top counties in corn production and soybean production in 2000, for a total of 14 counties.

Figure 3:
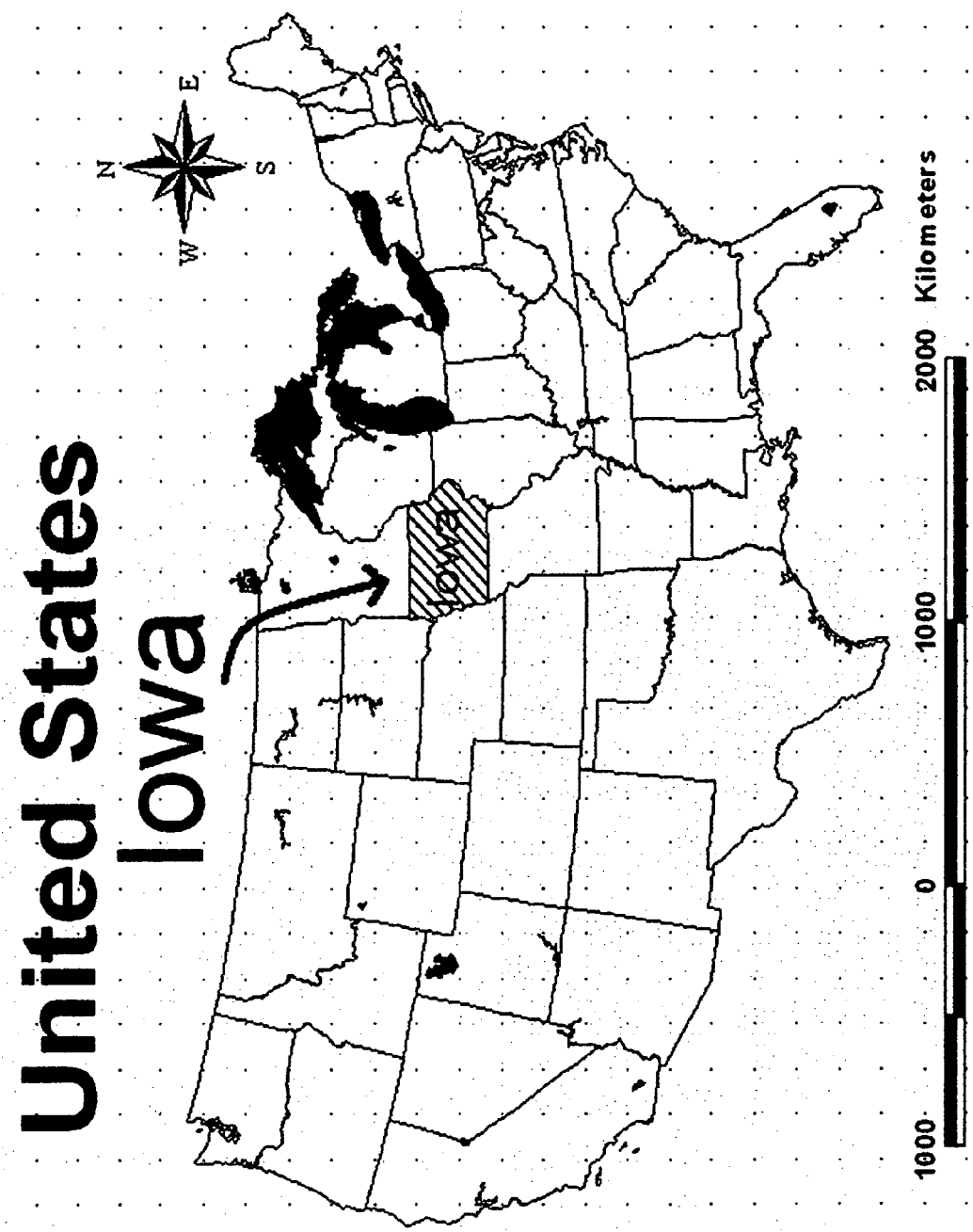
FIG. 3 shows a map of the United States of America showing the location of the State of Iowa.

Referring to FIG. 3, Iowa, positioned in a humid temperate zone, can be approximately presented as a rectangular area formed by (97° W, 43.5° N), (97° W, 40.5° N), (90° W, 40.5° W) and (90° W, 43.5° N). The total area of Iowa is about 35,756,390 acres, where approximately 11,700,000 acres (~32.7% of the total area) include planted corn for grain in 2001. Of these 11,700,000 acres, approximately 11,400,000 acres (~31.9% of the total area) were harvested in the same year. The 1997 Census of Agriculture reports that Iowa ranked highest in corn production with 7.9% of all corn for grain in the U.S. Soybean is the second largest amount of crop produced; approximately 10,920,000 acres (~30.5% of the total area) were harvested in 2001.

Corn season generally runs from the middle of spring to the end of summer/beginning of fall. Usually, it is planted in early May, grown from June to September, and harvested in September. Because of this long season, it may be helpful to use averages from collected data. Therefore, this example applies monthly averages of NDVI, SM, ST and Rainfall data collected for 20 years stemming from 1982 to 2001.

Similarly, soybean season also has a length season, running from the middle of May to October. Soybean is usually actively sown from the middle of May to early June, grown from June to September, and harvested in October. The yearly average of NDVI, SM, ST and Rainfall data for the months June to September for a 20 year period (1982 to 2001) is applied in this example.

Figure 4:
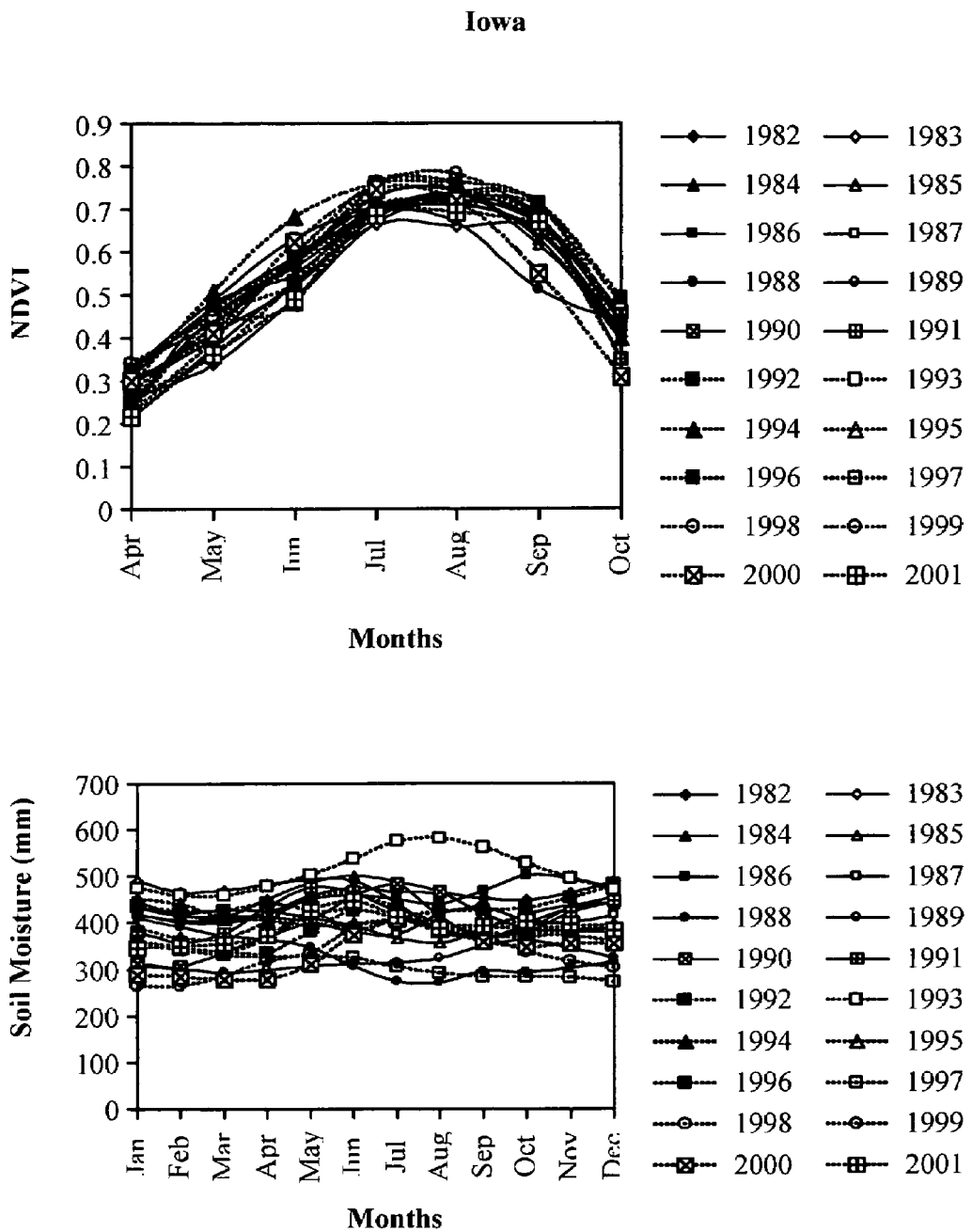
FIG. 4 shows the average monthly NDVI and SM (measured in mm) variations for Iowa from 1982 to 2001 for each month.
Figure 5:
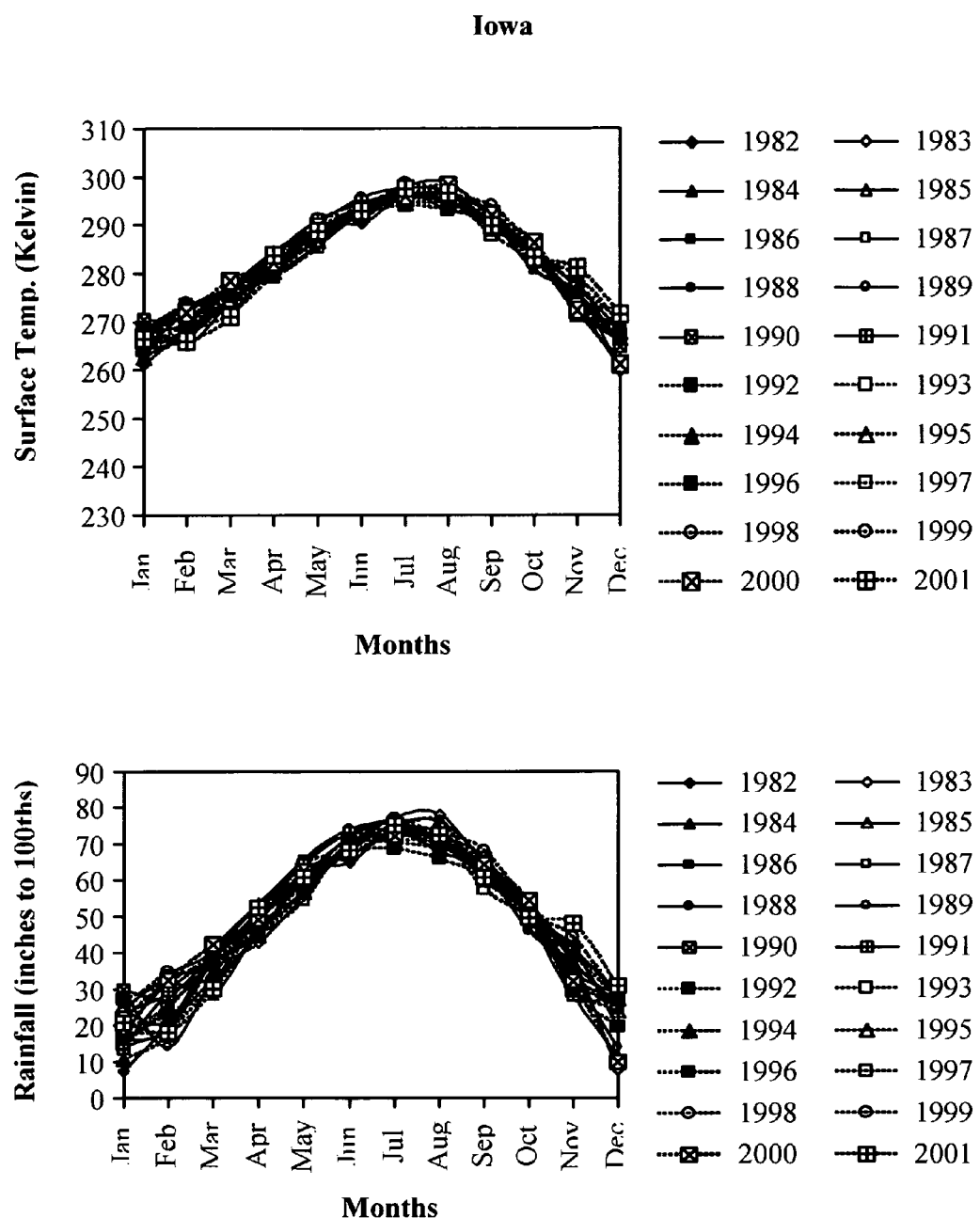
FIG. 5 shows the average monthly ST (measured in Kelvin) and Rainfall (measured in inches to 100ths) variations for Iowa from 1982 to 2001 for each month.

With respect to both corn and soybean, NDVI data used is a monthly composite from 1982 to 2001. Furthermore, NDVI data is spatially averaged over Iowa regions during this time span. FIGS. 4 and 5 depict Iowa's monthly average of NDVI, SM, ST and Rainfall from 1982 to 2001.

Figure 6:
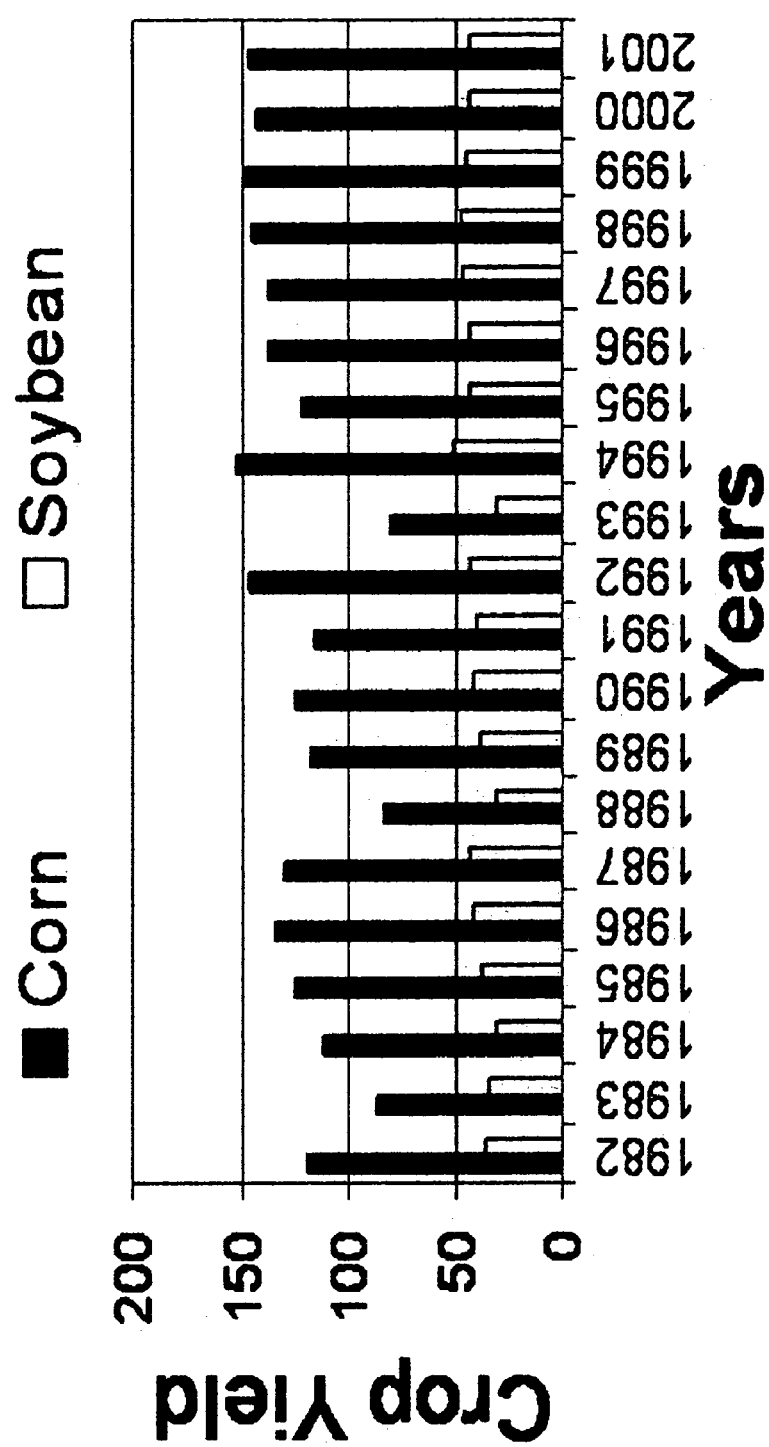
FIG. 6 shows corn and soybean crop yield from 1982 to 2001.

Data sets of corn and soybean yield estimates may be obtained from the National Agriculture Statistical Survey (NASS) of the United States Department of Agriculture (USDA) database. Corn yield total estimates are available from 1866 to 2003. Soybean yield total estimates are available from 1924 to 2003. These data sets provide, inter alia, crop production data based on planted and harvested acreage, yield per harvested acre, production, price per bushel and value of production. Average yields (in bushels) per acre for 1982 to 2001 may be seen in FIG. 6.

A. Variable Variations

The United States Geological Survey (USGS) defines NDVI as an index composited together using multiple AVHRR daily observations to create a nearly cloud-free image showing maximum greenness. As a digital map that can be used and/or stored on any computer, a greenness map may be used to indicate the vegetation condition of a region. Generally, healthy vegetation is considered an indicator of favorable climatic and environmental conditions, whereas poor vegetation is considered an indicator of drought and diminished productivity.

An 8 km×8 km monthly composite continental NDVI data set from a Pathfinder AVHRR Land (PAL) data set collected by NOAA's polar orbiters for 20 years from 1982 to 2001 may be used. PAL data may be considered as Level 3 products, which include global mapped data sampled in space and time. Examples of Level 3 products include Daily Data Set, Composite Data Set, Climate Data Set and Browse Images. One or any combination of these products may be used.

A Daily Data Set may contain global, 8 km, terrestrial data mapped to an equal area projection. Any data with a Solar Zenith Angle (SZA) greater than 80 degrees may be discarded because of rapid degradation of data in twilight areas. The Daily Data Set can be useful in studying many terrestrial variables (e.g., vegetation, temperature, snow cover, etc.), as well as producing a variety of composite data sets.

A Composite Data Set is similar to daily data in structure and may be derived from the Daily Data Set. However, the compositing process may remove much of the contamination due to cloud cover potentially present in the Daily Data Set. To generate the Composite Data Set, 8 to 11 consecutive days of data may be combined, taking the observation for each 8 km bin from the date with the highest NDVI value. Choosing the highest NDVI pixel may also eliminate most pixels with clouds and atmospheric contaminants. It is preferable to use data within 42 degree of nadir in the composite to minimize spatial distortion and bidirectional effect biases at the edge of a scan.

PAL parameters for the Daily Data Set and Composite Daily Set include, but are not limited to, NDVI; clouds from AVHRR (CLAVR) flag (cloud flag); Quality Control flag (QC flag); Scan Angle; SZA; Relative Azimuth Angle; AVHRR Channel 1 (Ch1) and Channel 2 (Ch2) reflectances; AVHRR Channel 3 (Ch3), Channel 4 (Ch4) and Channel 5 (Ch5) brightness temperatures; and day of year.

A Climate Data Set may contain, as its parameter, a mean NDVI. As an embodiment, the Climate Data Set may be a global, mean, cloud-free, NDVI data at 1-degree by 1-degree resolution for each 8-day to 11-day composite period. This data set can be derived from the Composite Data Set; there can be 36 climate data files for each year. Typically, the Climate Data Set is intended primarily for use in Global Climate Models (GCM), Simple Biosphere Models and other global time series studies.

Browse Images may be generated from the Daily and Composite Data Sets to aid in scene selection. The Browse Images may be produced by subsampling every eighth pixel of every eighth line of full resolution daily and composite data files. A daily Browse Image may include two parameters, Ch2 reflectance (as described herein) and Ch4 brightness temperature (measurable from 160 to 340 Kelvin). Both can be useful in determining cloud extent and an area of missing data. Each 10-day composite Browse Image may include, as its parameters, NDVI and Ch4 brightness temperature. Both can be useful for identifying areas of residual cloud contamination. Because of their rescaling and subsampling, these images are generally applied in data selection and are generally not recommended for data analysis.

There may also be an ancillary data file for PAL. Coinable as the Pathfinder Ancillary File, this file may contain, as its parameters, land and sea flags, elevation, and bin center latitude and longitude. As an embodiment, one or any combination of these parameters may be applicable to global, 8 km bins, which can be co-registered to the same 8 km equal area projection as the Daily Data Set and Composite Data Set. This ancillary file can be used to assist in interpreting Daily and Composite data.

According to the National Aeronautics and Space Administration (NASA), NDVI is related to the proportion of photosynthetically absorbed radiation. It is a unitless ratio that may be highly correlated with vegetation parameters, such as green-leaf biomass and green-leaf area. Ranging from −1 to +1, NDVI may be calculated using atmospherically corrected reflectances from visible AVHRR channel (Ch1) and near infrared AVHRR channel (Ch2), where an equation can be: (Ch2−Ch1)/(Ch2+Ch1). Both Ch1 and Ch2 may be expressed in percentages from 0 to 100. The difference between Ch1 and Ch2 responses to vegetation helps serve as a basis for NDVI derivation. Ch1 involves part of the spectrum where chlorophyll can absorb a considerable amount of incoming radiation. Ch1 is deemed as the reflectance in visible wavelengths, which typically range from 0.58 µm to 0.68 µm. In contrast, Ch2 involves a spectral region where spongy mesophyll leaf structure may lead to considerable reflectance. Ch2 is deemed as the reflectance in infrared wavelengths, which typically range from 0.725 µm to 1.1 µm.

The visible wavelength attenuation encountered in AVHRR observations does not differ significantly from the Landsat MSS (Multi-Spectral Scanner) and Thematic Mapper sensors of the French SPOT sensors, but may be considerably more sensitive to water vapor attenuation in the near-infrared than other land observing sensors. It should be noted that NDVI derived from NOAA 11 data may show values 0.05 higher than previous NOAA missions for African desert. However, this discrepancy should not affect the overall results of the current study since the bin range used is often greater (e.g., 0.25) than an estimated error of approximately 0.05.

Preferably, NDVI in a PAL data set should be based on Hierarchical Data Format (HDF), such as Scientific Data Set (SDS) or Raster Image Set (RIS). PAL is usually validated continually to make sure no error in the data processing stream exist. Furthermore, PAL may employ an atmospheric correction software, such as Ozone and Rayleigh Correction (ORC) software that includes an ORC algorithm for calculating atmospheric corrections. However, because of erroneous coding errors in the ORC software, and the discovery of an error in calculating the SZA, it is recommended that ORC software to be avoided until this problem is resolved.

It is well known in the art that errors in SZA may affect reflectances and NDVI. In general, the differences in NDVI obtained with accurate and inaccurate SZA may be negligible, whether or not ORC algorithm is used. However, if Ch1 and Ch2 reflectances are normalized for changes in SZA, and corrected for ozone absorption and Rayleigh scattering, using ORC software, substantial errors in the reflectances may result. Because ORC depends strongly on SZA, errors in SZA may lead to large errors in reflectances in calculated NDVI with ORC as compared to that of calculated NDVI without ORC. Hence, as one way to avoid potentially large errors, it is preferable not to use the ORC software until errors in SZA are resolved. As an alternative, HDF may be used for a PAL data set since the reflectances and NDVI are less likely to be affected by SZA errors; the ORC algorithm is not applied to such data set.

Quantitative interpretation, on the other hand, in the analysis of NDVI may be complicated by numerous intervening QC flags (e.g., instrument calibration, incident solar irradiance, nominal atmospheric attenuation, variable spatial resolution, and anisotropy with off-nadir views, etc.), cloud occurrence (e.g., cloud flags) and any missing data (e.g., missing orbit(s), scan(s), etc.). QC and cloud flags tend to identify land surface areas where measured variables are degraded. These factors may combine to produce a global data set that possibly has, at best, a measurement precision of ±0.1 NDVI units (±10% error) over 1 year at a temporal resolution somewhere between 10 days and 1 month. To account for these potential factors, QC flags and cloud flags ought to be scaled and calibrated.

Dry matter accumulation in corn leaves generally matures by mid July and remains almost constant from mid July to the beginning of September. The maximum vegetation greenness in the regions studied here generally occurs in August. Spatially averaged NDVI for various months during the corn growing season and monthly combinations thereof may be examined to find a better correlation to corn yield estimates.

SM data may be obtained from the NOAA NCEP Climate Prediction Center (CPC) global monthly soil moisture data set, where the units may be in millimeters. This data set is a global monthly high resolution soil moisture data set. Soil moisture may be calculated based on the water balance in the soil.

Monthly ST data may be obtained from the NOAA NCEP-National Center for Atmospheric Research (NCAR) Climate Data Assimilation System-I (CDAS-1) monthly diagnostic surface temperature database. The temperature may be measured in Kelvin.

Rainfall data for years 1982 to 2001 may be obtained from the NOAA NCEP. Rainfall data is available as monthly averages within a climatic division calculated using equal weight for stations reporting both temperature and precipitation within such a division. Monthly total rainfall is measured in ¹⁄₁₀₀th of an inch.

B. Results

Using a non-linear piecewise linear regression with break point (Quasi-Newton) method, corn yield and soybean yield may be predicted. FIG. 7 highlights results obtained for years 1982 to 2001. FIG. 8 shows the coefficients used for each variable in the empirical equations to predict crop yield, as well as the break point, R value, variance accounted %, and R-square value.

Figure 9:
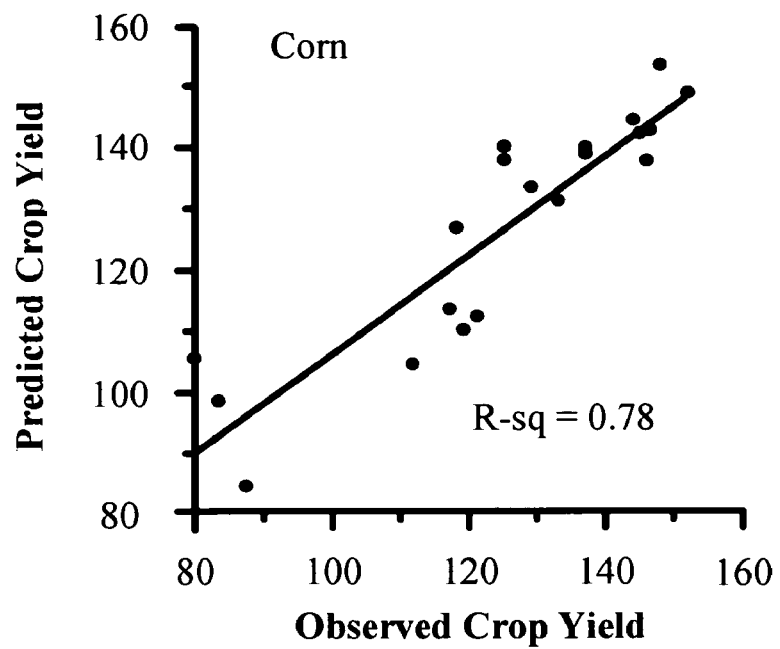
FIG. 9 shows observed and predicted crop yield of corn and soybean for Iowa.
Figure 9:
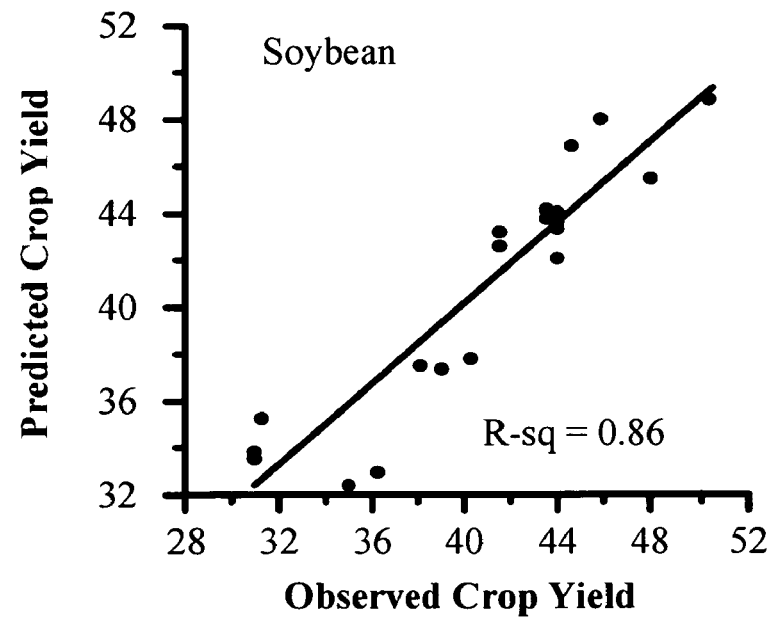

FIG. 9 show the predicted and observed crop yield for corn and soybean. In this figure, the present invention indicates a good correlation with observed and predicted crop yield for soybean. The residual values in individual years indicate more or less an even distribution of the difference from the observed crop yield, and appear to be within acceptable limits. Similarly, crop yield for corn appear to show an even distribution of residual values for all years except for 1993. However, the present invention still appears to be valid for 1993, when a steep fall (~46%) occurred in the observed crop yield when compared to the preceding year. This drop, which may be seen in FIG. 7, indicates that some other factor(s) may possibly dominate in certain years to cause a steep decline. Perhaps some of these factors include, for example, amount of fertilizer or type of fertilizer used. However, a moderate to high R-square value of 0.78 for corn and 0.86 establishes that in most years, crop yield is largely governed by variables considered in the present invention.

Still, other factors, such as pests and diseases, may cause local deviation in the predicted crop yield. Such factors may pose a serious problem for any forecasting method. However, the NDVI in the present invention partly addresses loss due to diseases or pests that directly affect vegetation. Overall, the crop yield prediction method is expected to yield good results due to low residual values and historical data. As more data is inputted, e.g., data sets from 15 years, more realistic results can be generated.

2. India—Wheat and Rice

Wheat and rice are two major crops in India. Generally, wheat is considered as one of the most common agricultural crops in northern India, whereas rice is considered as the common crop in southern India. While India can cultivate various kinds of wheat and rice in certain seasons, this embodied example explores Rabi wheat, which translates to post-rainy season wheat, and Kharif rice, which translates to rainy season rice.

The Rabi wheat season usually ranges from fall to mid spring. Wheat in this season is typically sown from October to December and grown from January to April.

The Kharif rice season typically ranges from late spring to fall. Rice in this season is generally planted from May to July with the onset of monsoons, grown during July to September, and harvested, depending on the region, sometime between September to October. Growth in biomass tends to increase NDVI. Inter-annual crop yield, particularly Kharif rice, in the agricultural sector may be directly related to the distribution and timing of monsoon rainfall.

NDVI may be calculated using NOAA AVHRR data, which is a measure of vegetation cover. NOAA AVHRR based VCI and TCI are commonly known for analyzing various agricultural factors. These factors include detecting drought, monitoring excessive soil wetness, assessing weather impacts on vegetation, and evaluating vegetation, health and productivity.

A. Variable Variations

This example uses monthly average NDVI data from 1984 to 1999. Such data can be extracted from NOAA AVHRR 10-day composite NDVI images. SM data, measured in millimeters, may be taken from NOAA NCEP CPC Global Monthly Soil Moisture Data set. Monthly ST data, measured in Kelvin, is from NOAA NCEP-NCAR CDAS-1 MONTHLY Diagnostic surface temperature. Rainfall data is obtained from Live Access Server—Indian Monsoon Data, GTS Gauge-Based Global Daily Precipitation Analyses Over Land 1977-2001. Rainfall data, measured in $1/10$th mm per day, is available as daily rainfall based on gauge measurements. Monthly total rainfall, measured in $1/100$th mm per day, is computed from the above data year wise from 1984 to 1999.

Crop yield data is taken from the Economic Intelligence Service of the Centre for Monitoring Indian Economy Pvt Ltd. (CMIE) (Mumbai, India).

Variance and co-variance correlation matrix studies show that dependent variable crop yield may vary diversely with independent variables, such as NDVI, SM, ST and Rainfall. Moreover, the degree of correlation between two variables may vary dynamically not only for the Kharif rice and Rabi wheat seasons, but also region wise due to influences in different climatic zones and soil type.

Generally, NDVI, SM, ST and Rainfall data do not reveal a linear relationship with crop yield. However, commonly applied multiple regression approaches, e.g., Analysis of Variance (ANOVA), assume that the relationship between independent variable(s) and the dependent variable is linear in nature. Therefore, the example does not apply multiple regression.

Rather, a non-linear estimation approach may be used to compute the relationship between a set of independent variable(s) and a dependent variable. A crop yield estimation equation may be derived separately for each state and each major crop season, such as wheat and rice, based on available data. Hence, in general, whenever simple linear regression approaches do not appear to adequately represent the relationships between variables, the non-linear regression estimation approach is considered to be appropriate.

Figure 10:
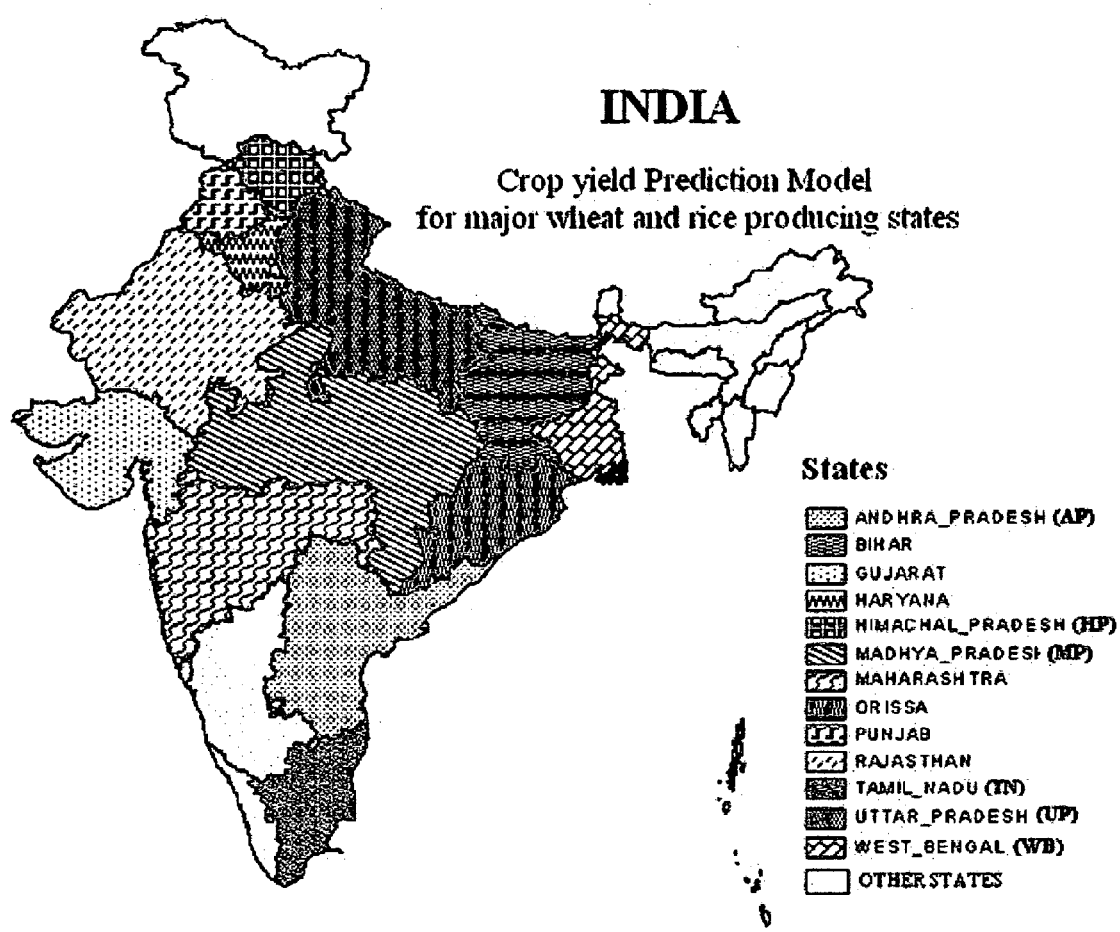
FIG. 10 shows a map of India showing major wheat and rice producing states.
Figure 11:
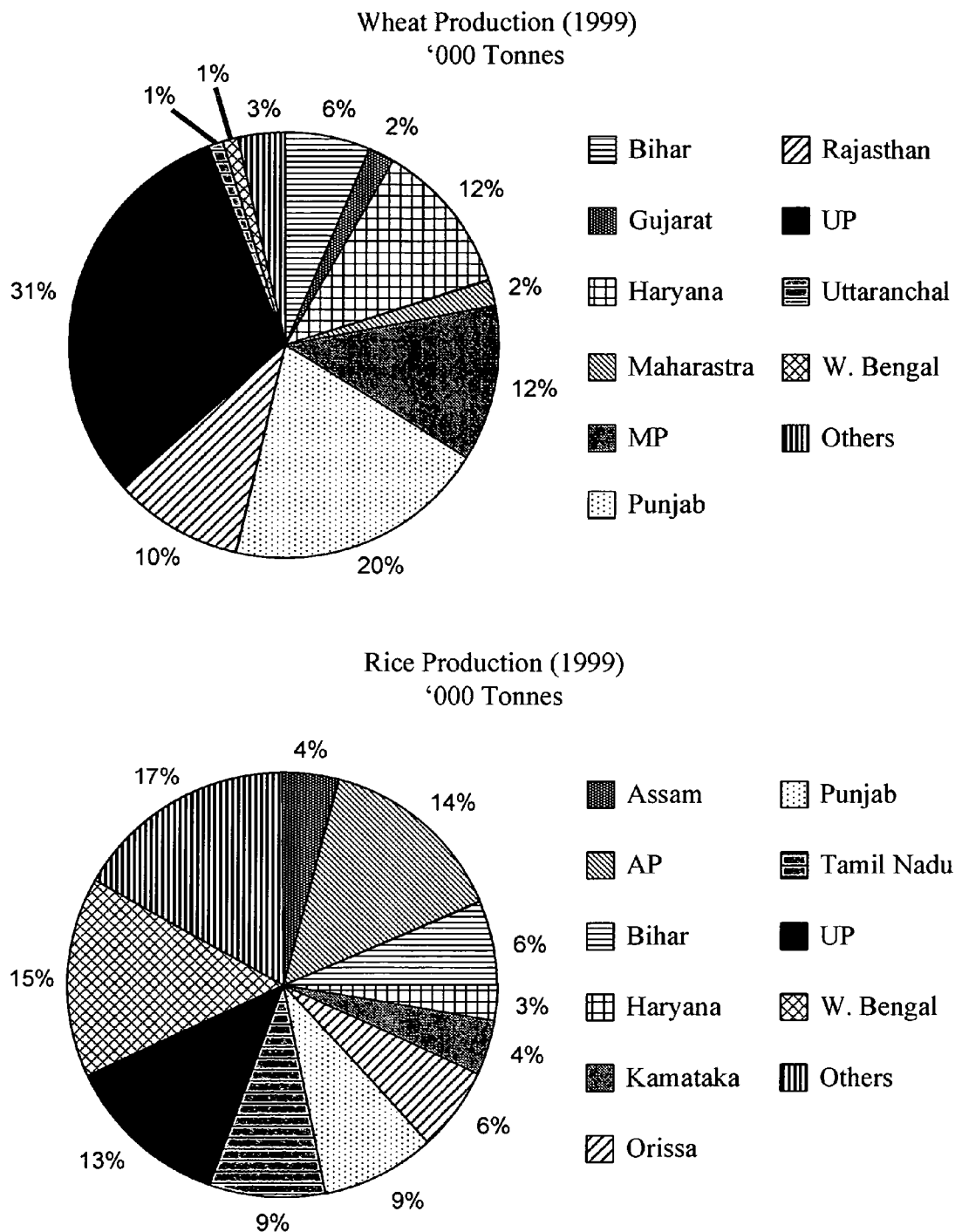
FIG. 11 shows wheat and rice crop production in thousand tones for the year 1999 for major crop producing states in India.
Figure 12:
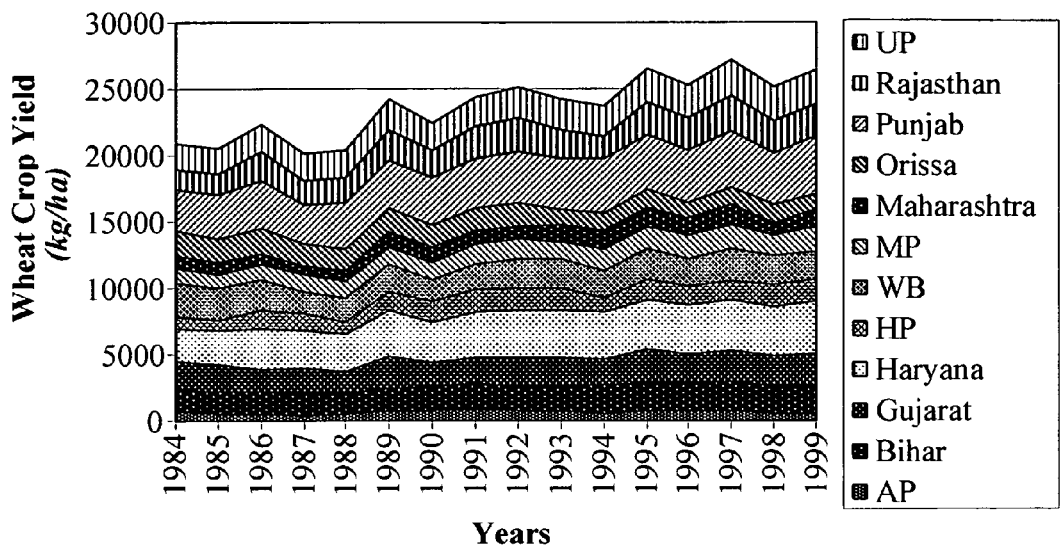
FIG. 12 shows wheat crop yield (Kg/ha) from 1984-1999 for major wheat producing states of India and rice crop yield (Kg/ha) from 1984-1999 for major rice producing states of India. Thickness of column in a particular year gives wheat and rice yield in Kg/hectare for each state. This figure shows a uniform and gradual increase of crop yield over years since 1984.
Figure 12:
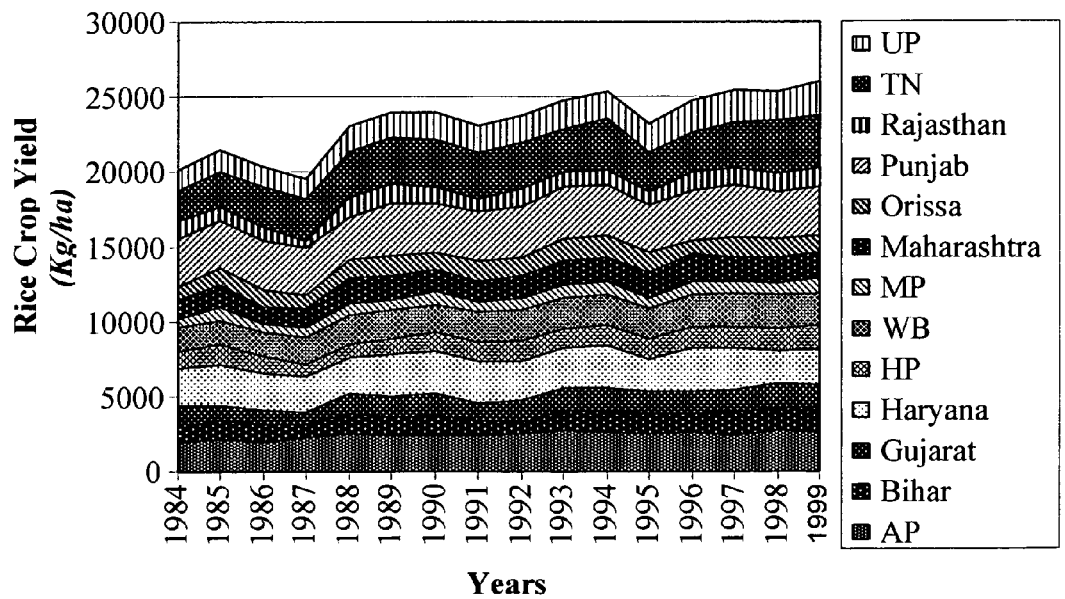

FIG. 12 shows yearly wheat crop yield and rice crop yield for different states of India, which are identified in FIGS. 10 and 11.

Figure 13:
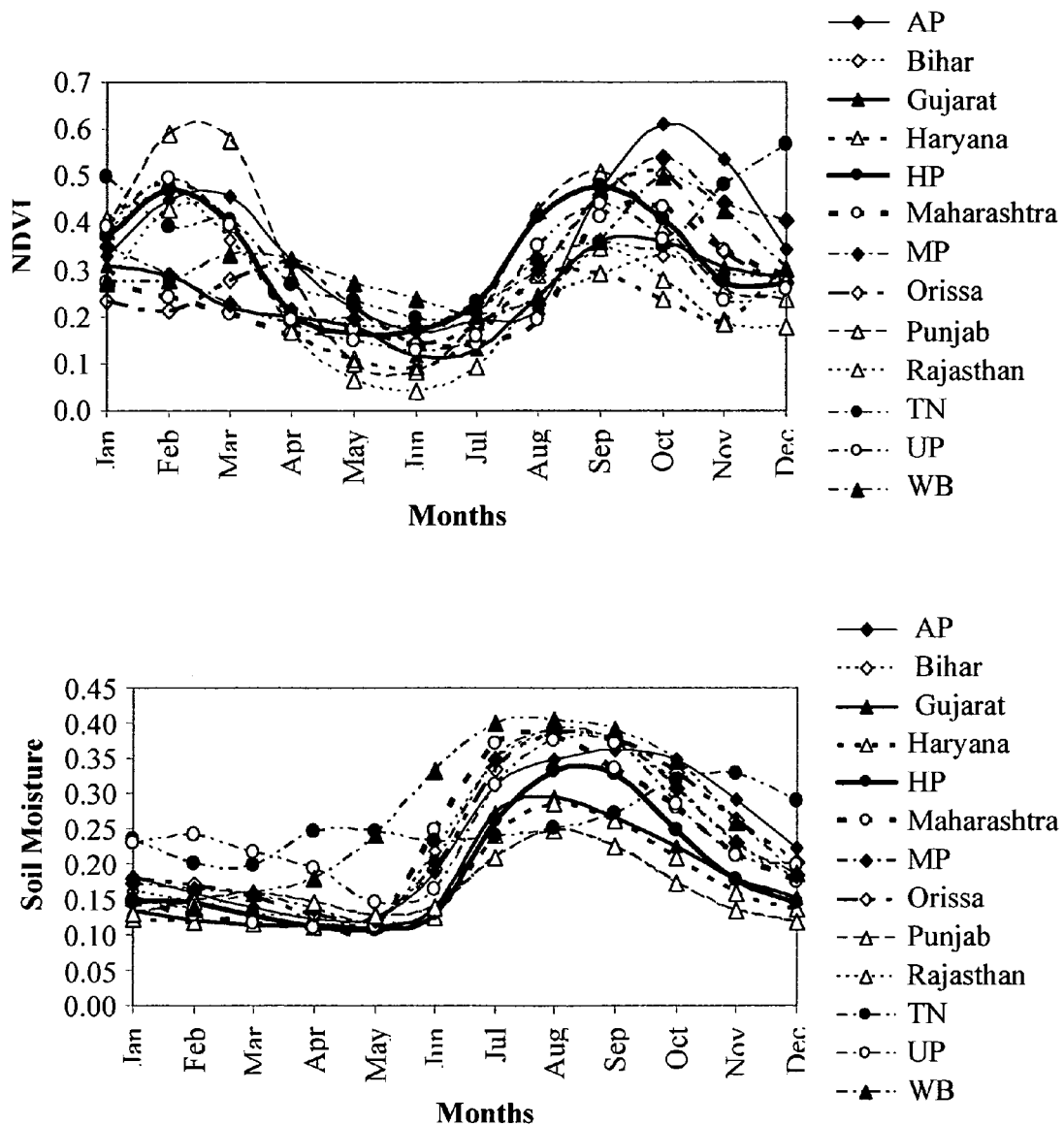
FIG. 13 shows average monthly NDVI and SM variations for major wheat and rice producing states in India from 1984 to 1999 for each month.
Figure 14:
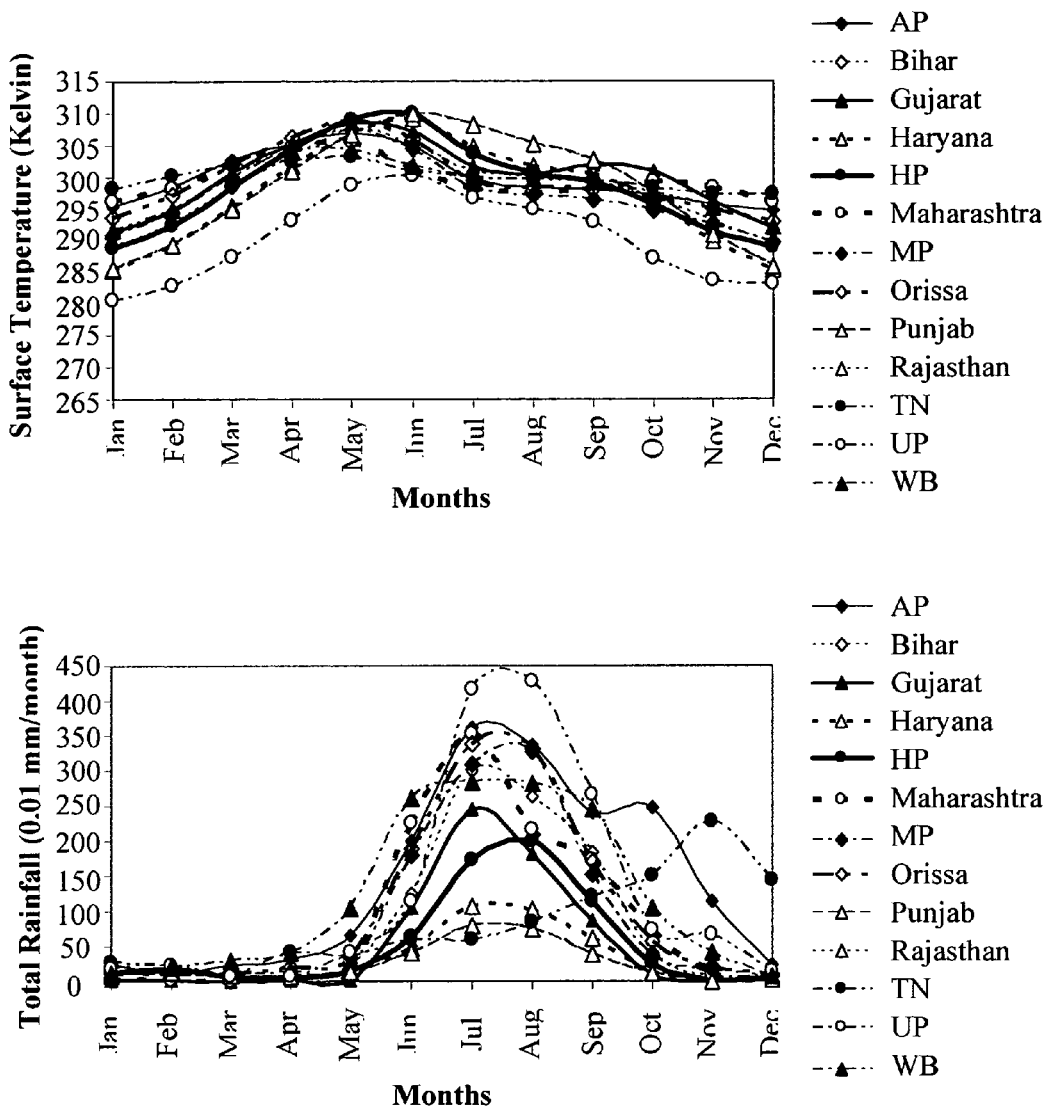
FIG. 14 shows average monthly ST and total Rainfall variations for major wheat and rice producing states in India from 1984 to 1999 for each month.
Figure 15:
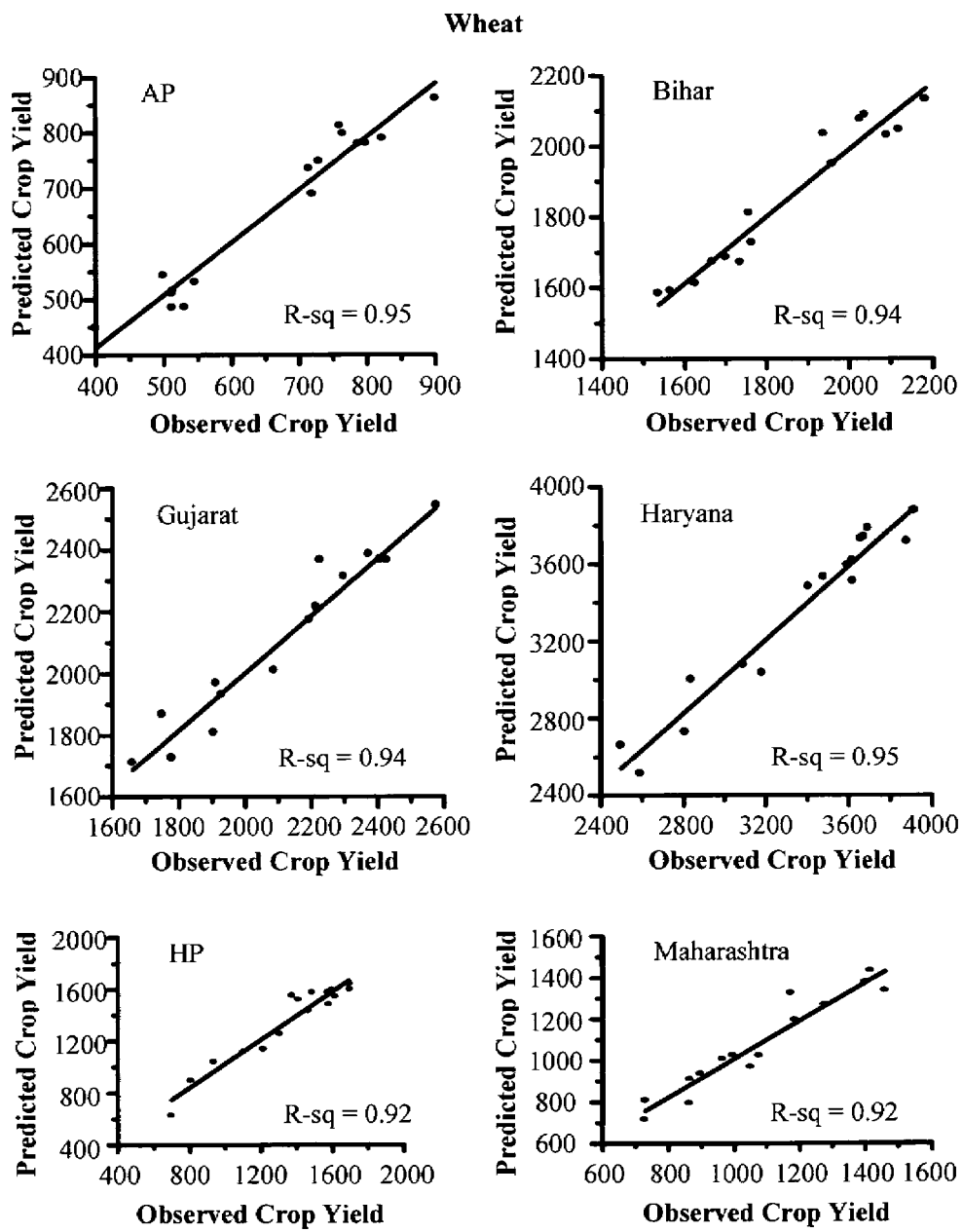
FIG. 15 shows observed versus predicted crop yield of wheat for several major wheat producing states in India.
Figure 16:
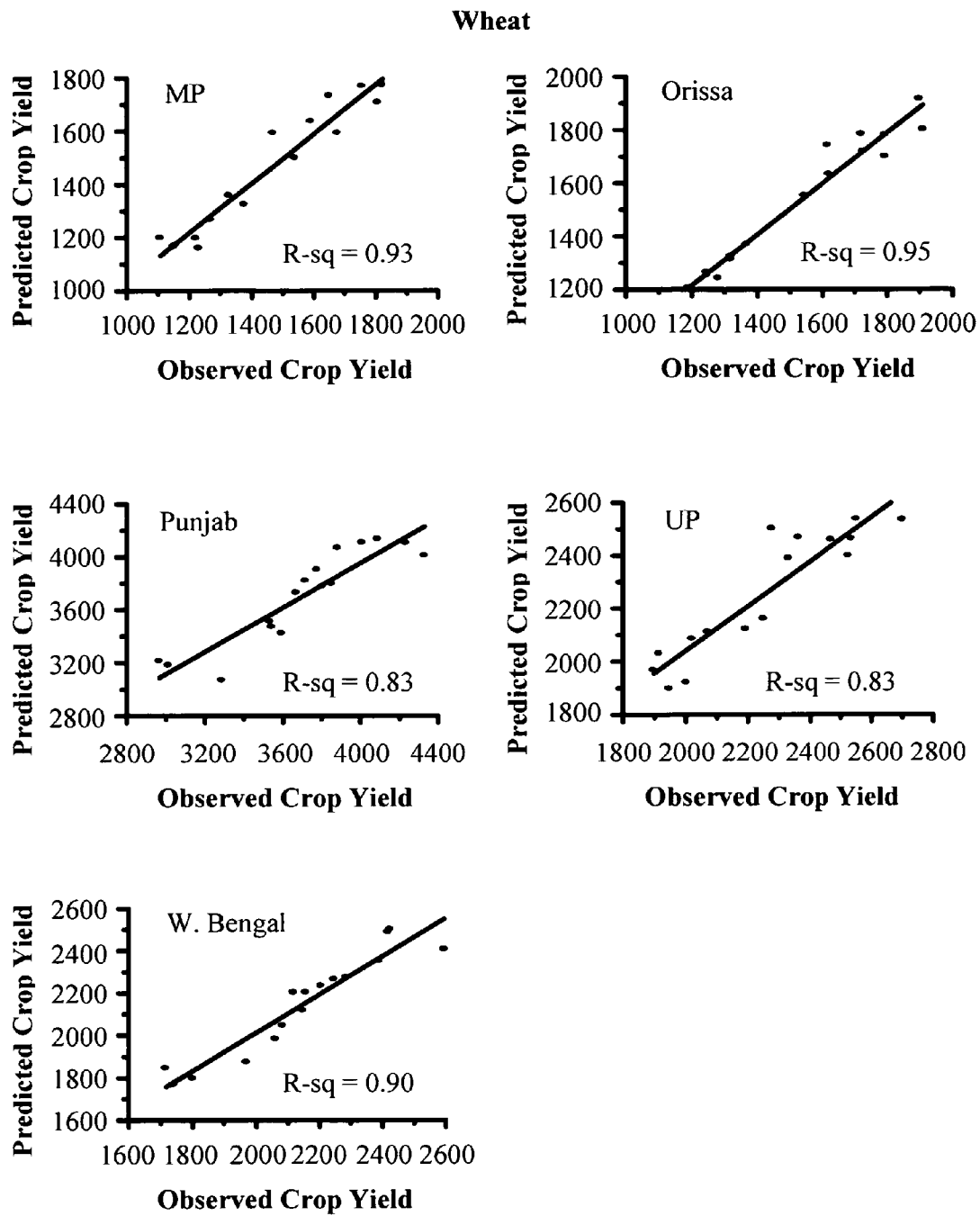
FIG. 16 also shows observed versus predicted crop yield of wheat for additional major wheat producing states in India.
Figure 17:
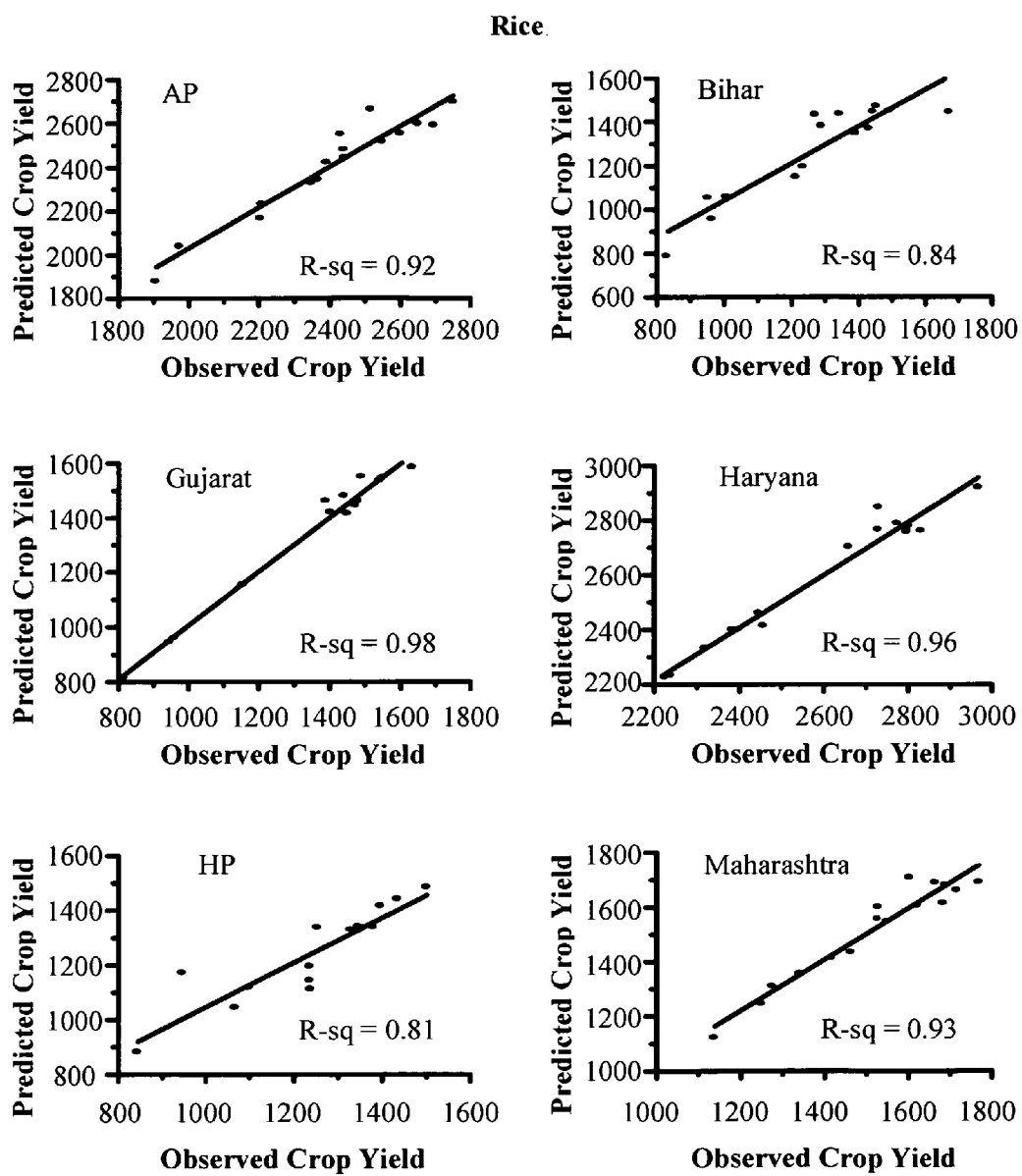
FIG. 17 shows observed versus predicted crop yield of rice crop for several major rice producing states in India.
Figure 18:
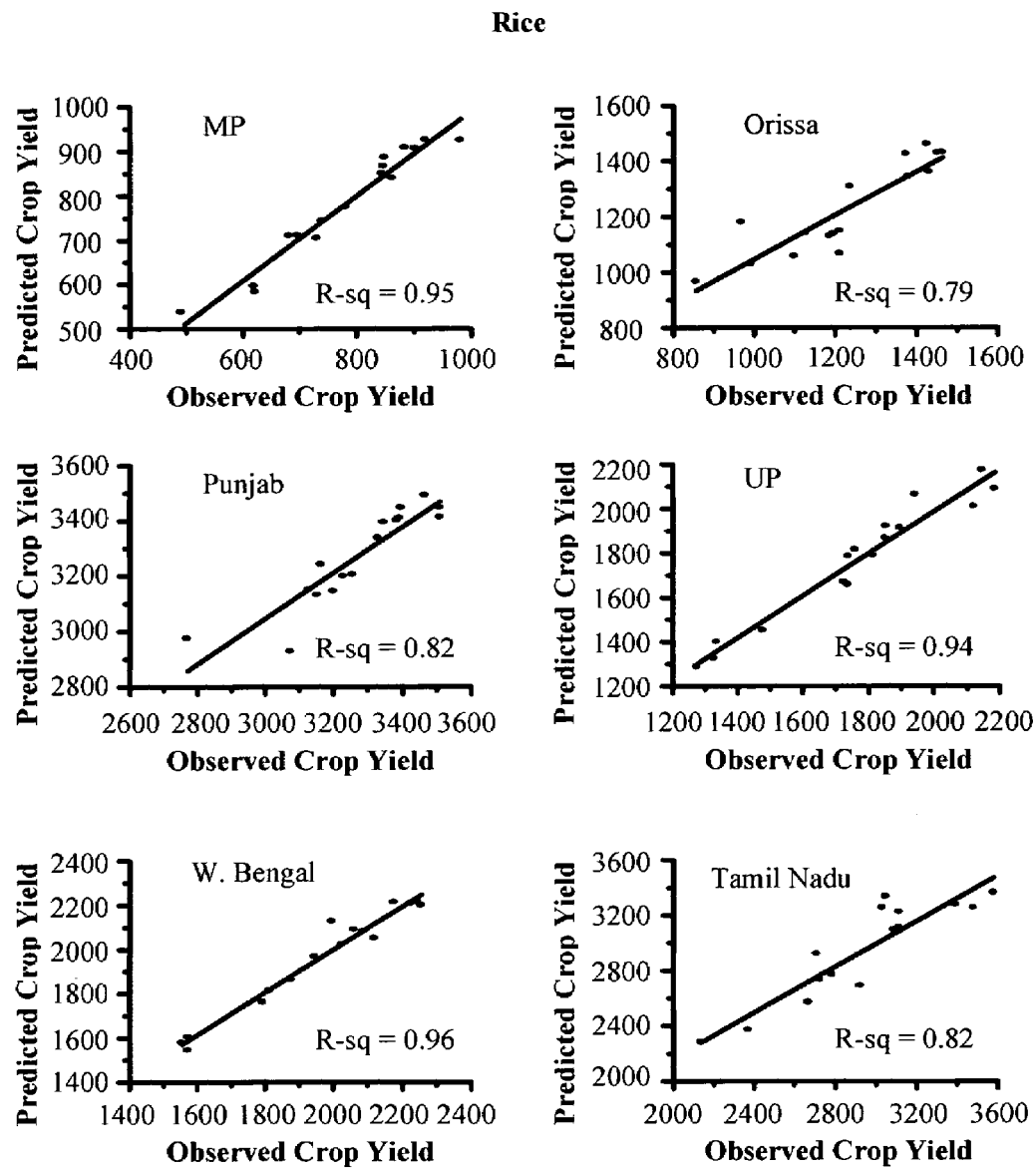
FIG. 18 also shows observed versus predicted crop yield of rice crop for additional major rice producing states in India.

Overall, FIGS. 13 and 14 show average variations of NDVI, SM, ST and Rainfall for different states ranging from 1984 to 1999. Because these variables appear to have non-linear relationships, a non-linear approach may be used to determine any underlying empirical relationships. Furthermore, a variance—co-variance relationship seems to exist and shows variables' variations with respect to region and time. To maximize data variation, the crop yield estimation approach should include all these factors.

As depicted in FIG. 13, the monthly average value averaged over 16 years from 1984 to 1999 shows a general variation of NDVI for different states. NDVI generally increases from January to February, and decreases afterwards until April. It tends to remain at low values (~0.1-0.2) and increases again with the onset of monsoons around July. NDVI also tends to increase rapidly with a value of ~0.6 for most states, and decreases after October with monsoon withdrawal. However, it may remain high (~0.2-0.5) from November to December. This fluctuation suggests a contrasting difference in variations and trends among different states from January to April.

Also depicted in FIG. 13, SM average for 16 years from 1984 to 1999 shows uniform variation for different states. A distinct slight decrease in SM from January to May can be seen due to seasonal change from winter to summer. However, SM may rapidly increase with monsoons from June to August-September, while decreasing monotonously from September to December.

As depicted in FIG. 14, monthly average of ST for 16 years from 1984 to 1999 shows a conspicuous peak in temperature in May and June. A possible reason for the peak is the summer season. Afterwards, ST decreases through to December. ST tends to rise again after the winter season and then increases rapidly to attain a peak value (e.g., 310 K) during May and June.

Also depicted in FIG. 14, monthly total Rainfall average, measured to the nearest 0.01 mm/month, for 16 years from 1984 to 1999 shows that monsoon rainfall is the major source of water for most parts of India. Generally, high rainfall occurs from June to September, where it peaks during July and August. In other months, rainfall tends to be scanty. The dry season often runs from November to May.

B. Results

Using a non-linear piecewise linear regression with break point (Quasi-Newton) method, predicted and observed crop yield are close with low residual values. FIGS. 15, 16, 17 and 18 show that the fit of the crop yield empirical equation can be judged by plotting observed values against predicted values. With most of the data variance account for, these figures show the existence of a high correlation. Additionally, the low residual values suggest a good statistical fit of data with the crop yield empirical equation.

FIG. 19 shows the coefficients used for each variable in the empirical equations to predict wheat crop yield, as well as the R value, variance accounted % and R-square value. Similarly, FIG. 20 shows the coefficients used to predict rice crop yield.

To calculate proportional variance, the total variance of a dependent variable (total sum of squares, SST), the proportion of variance due to residuals (error sum of squares, SSE), and the proportion of variance due to the regression approach (regression sum of squares, SSR=SST−SSE) may be determined for each state and each crop. The ratio of SSR to SST (SSR/SST) may help explain the proportion of variance accounted for in the dependent variable (y). Thus, the ratio should be equivalent to the R-square value (the coefficient of determination, $0 \leq R-square \leq 1$), as shown in FIGS. 19 and 20.

In sum, historical satellite and meteorological data have been used to derive an empirical equation to forecast wheat or rice crop yield for major crop growing states. NDVI, SM, ST and Rainfall data have been fitted to a predefined empirical equation using piecewise linear regression and optimization of least square loss function through a non-linear Quasi-Newton method. A non-linear and iterative method can help minimize loss function to yield values for the coefficients of the empirical equations. As indicated via this example, the present invention can achieve an accuracy of >90% in most cases. However, various factors, such as pests, diseases, etc., can cause local deviation in predicted crop yield. These kinds of factors may pose a serious limitation to any forecasting method. Yet, the inclusion of NDVI may help partly address loss due to diseases or pests that directly affect vegetation. The crop yield prediction empirical equation can yield good prediction results because of low residual values as with historical data.

To yield better prediction results, the present invention may be optimized and evolved with growing historical data. For example, the present invention can use higher resolution data and/or multiyear data. In addition, the present invention can be suitably modified to compare monthly NDVI, SM, ST and Rainfall with other measures of crop yield, like the monthly Dry Matter Productivity (DMP) or Net Primary Productivity (NPP), to get monthly prediction of crop yield in a given crop growing season. Other measures may include light, carbon dioxide, evapotranspiration, and the rate of growth and development. The present invention may even use easily gathered input data sets as opposed to more difficult-to-gather and complex input data sets. Furthermore, the present invention may be suitably modified to add or drop variables depending on the climate, region and crop type, and can be extended to compute predicted crop yield of other crops as well.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used to predict other crops including, but not limited to, vegetables, fruits, nuts, legumes, etc. Furthermore, the present invention may be applied anywhere in the world, including other countries, territories, commonwealths, states, provinces, etc.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A computer readable storage medium, embodying a program of instructions executable by a machine to perform a method for predicting crop yield, said method comprising the steps of:
    a. receiving data, said data including:
        i. normalized difference vegetation index data;
        ii. soil moisture data;
        iii. surface temperature data; and
        iv. rainfall data; and
    b. identifying a "piecewise linear empirical equation with at least one break points" with said data, said "piecewise linear empirical equation with at least one break point" including coefficients; and
    c. determining said coefficients for said "piecewise linear empirical equation with at least one break point" by performing an optimization process on said "piecewise linear empirical equation with at least one break point" using said data; and
    wherein said at least one break point is selected using the average from a user-selected range of time for a user-selected crop in a user-selected area of interest.

2. The computer readable storage medium according to claim 1, wherein said data comprises time-incremental data for a user-selected range of time.

3. The computer readable storage medium according to claim 2, wherein the averages of said time-incremental data are selected according to crop growing and ripening seasons.

4. The computer readable storage medium according to claim 1, wherein said optimization process includes performing multiple iterative convergences of said "piecewise linear empirical equation with at least one break point" using said data for optimizing said coefficients.

5. The computer readable storage medium according to claim 4, wherein said optimization process uses a non-linear Quasi-Newton method.

6. The computer readable storage medium according to claim 5, wherein said non-linear Quasi-Newton method applies a loss function.

7. A crop yield predicting device comprising:
    a. a data collector for receiving data, said data including:
        i. normalized difference vegetation index data;
        ii. soil moisture data;
        iii. surface temperature data; and
        iv. rainfall data; and b. a data analyzer for:
  i. identifying a "piecewise linear empirical equation with at least one break point" with said data, said "piecewise linear empirical equation with at least one break point" including coefficients; and
  ii. determining said coefficients for said "piecewise linear empirical equation with at least one break point" by performing an optimization process on said "initial piecewise linear empirical equation with at least one break point" using said data, and wherein said at least one break point is selected using the average from a user-selected range of time for a user-selected crop in a user-selected area of interest.

8. The device according to claim 7, wherein said data comprises time-incremental data for a user-selected range of time.

9. The device according to claim 8, wherein the averages of said time-incremental data are selected according to crop growing and ripening seasons.

10. The device according to claim 7, wherein said optimization process includes performing multiple iterative convergences of said "piecewise linear empirical equation with at least one break point" using said data for optimizing said coefficients.

11. The device according to claim 10, wherein said optimization process uses a non-linear Quasi-Newton method.

12. The device according to claim 11, wherein said non-linear Quasi-Newton method applies a loss function.

* * * * *